(12) United States Patent
Teramura

(10) Patent No.: US 9,217,863 B2
(45) Date of Patent: Dec. 22, 2015

(54) SCANNING OPTICAL SYSTEM AND IMAGE FORMING APPARATUS INCLUDING THE SAME

(71) Applicant: CANON KABUSHIKI KAISHA, Tokyo (JP)

(72) Inventor: Masayasu Teramura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/578,968

(22) Filed: Dec. 22, 2014

(65) Prior Publication Data

US 2015/0185473 A1    Jul. 2, 2015

(30) Foreign Application Priority Data

Dec. 26, 2013   (JP) .................................. 2013-268340

(51) Int. Cl.
| | |
|---|---|
| B41J 15/14 | (2006.01) |
| B41J 2/385 | (2006.01) |
| G02B 26/12 | (2006.01) |
| G03G 15/043 | (2006.01) |

(52) U.S. Cl.
CPC ............ *G02B 26/124* (2013.01); *G02B 26/123* (2013.01); *G03G 15/043* (2013.01)

(58) Field of Classification Search
CPC ... G02B 26/124; G02B 26/123; G03G 15/043
USPC ............... 347/118, 204, 241; 359/204.1, 204; 399/221, 200
See application file for complete search history.

(56) References Cited

U.S. PATENT DOCUMENTS

| | | | |
|---|---|---|---|
| 5,610,647 A | 3/1997 | Takada | |
| 5,870,132 A | 2/1999 | Inoue et al. | |
| 6,326,992 B1 | 12/2001 | Inoue et al. | |
| 8,654,168 B2 * | 2/2014 | Akatsu et al. | 347/241 |
| 2007/0146848 A1 * | 6/2007 | Fujita et al. | 359/204 |
| 2009/0214261 A1 * | 8/2009 | Hirakawa et al. | 399/221 |
| 2011/0002712 A1 * | 1/2011 | Kudo | 399/200 |

FOREIGN PATENT DOCUMENTS

| | | |
|---|---|---|
| JP | H11-311748 A | 11/1999 |
| JP | 3170798 B2 | 5/2001 |
| JP | 2010-217456 A | 9/2010 |

* cited by examiner

*Primary Examiner* — Julian Huffman
*Assistant Examiner* — Carlos A Martinez
(74) *Attorney, Agent, or Firm* — Carter, DeLuca, Farrell & Schmidt, LLP

(57) ABSTRACT

A scanning optical system includes a light source including light emission points, a deflector for deflecting a beam in main scanning direction, an optical element for guiding the beam from the light source to the deflector, and a stop for limiting the beam from the optical element, sets the followings appropriately: distance from the light source to the stop; focal length of the optical element; distance in main scanning direction from an intersection of optical axis and the light source at a farthest light emission point from the optical axis in main scanning direction; stop aperture diameter in main scanning direction; total angle at half maximum of a far-field pattern of emitted light; and angle between a marginal ray within main scanning section at the farthest light emission point from the optical axis in main scanning direction and a ray of a maximum intensity.

8 Claims, 9 Drawing Sheets

SCANNING OPTICAL SYSTEM AND IMAGE FORMING APPARATUS INCLUDING THE SAME

BACKGROUND OF THE INVENTION

1. Field of the Invention

The present invention relates to a scanning optical system, and more particularly, to a scanning optical system suitable in an image output portion of a laser beam printer, a copying machine, or the like.

2. Description of the Related Art

In recent years, in a scanning optical system in an image output portion of a laser beam printer, a copying machine, or the like, reduction of costs by manufacture of an imaging optical element by resin molding, enhanced speed by a surface emission type semiconductor laser (VCSEL), and higher definition by reduction of a spot size are in progress.

When an imaging optical element is manufactured by molding, a plurality of identical components is manufactured at the same time in order to improve productivity, and thus, variations in performance occur between the identical components, and in particular, variations in a direction of focus are wide.

A spot diameter is the same as the diameter of a circle of confusion, and thus, reduction of a spot size for higher definition means reduction of a width of a depth of the focus. Therefore, a slight displacement of the focus results in deviation from an allowable depth. In particular, an off-axis place is affected more by aberration than an on-axis place, and thus, in such a place, the width of the depth of the focus is further reduced.

Further, the following problem is involved in a multi-beam system for enhancing the speed. A semiconductor laser generally has a Gaussian distribution type intensity distribution in a direction perpendicular to an emission direction (far-field pattern: FFP). Depending on locations of a plurality of light emission points, the degree of vignetting of the FFP changes due to a stop arranged for controlling the spot diameter on a surface to be scanned. The larger a distance from an optical axis to the light emission point is, the greater the influence is, and thus, the intensity distribution of light beams from the light emission points which pass through the stop becomes asymmetrical. Increased asymmetry results in an increased spot diameter and a reduced width of a depth of a focus. In particular, a surface emission type semiconductor laser tends to have a narrower FFP compared with that of a related-art edge emission type semiconductor laser, and thus, the intensity distribution is more liable to become asymmetrical.

Japanese Patent Application Laid-Open No. H11-311748 discloses, as a method of maintaining the spot diameter and securing the width of the depth of the focus, a method in which, with regard to a single light emission point, a size of an aperture of a stop provided in a scanning optical system is controlled so as to be at a predetermined ratio with respect to a width of incident light beams ($1/e^2$ intensity slice of FFP).

Japanese Patent No. 3170798 discloses a method in which, with regard to a two-dimensionally arranged multi-beam, the relationship among a location of a light emission point, a location of a stop, and a focal length of a collimator is controlled so that a ratio of a size of an aperture of the stop to a width of incident light beams is a predetermined ratio. In the technology disclosed in Japanese Patent No. 3170798, by equalizing the degree of vignetting of the light beam by the stop among beams in the multi-beam, the spot diameter and the width of the depth of the focus can be the same among the beams in the multi-beam. Further, when the light emission points of a related-art multi-beam system such as one having two to four beams are in proximity to the axis, a range in which the stop can be located is relatively wide, and thus, the stop can be provided at an arbitrary location.

The technology disclosed in Japanese Patent Application Laid-Open No. H11-311748 is on the precondition that there is a single light emission point and that a light beam which passes through the stop has a symmetrical intensity distribution, and does not give any technical review of an optical system in which a light beam which passes through the stop has an asymmetrical intensity distribution such as one in which a light emission point is outside the multi-beam.

In recent years, for the purpose of enhancing the speed, a multi-beam including eight or more beams is sometimes used. In a system in which the location of the light emission point is away from the axis, a structure disclosed in Japanese Patent No. 3170798 requires the stop to be provided in proximity to a focal point on an image side of the collimator. In a scanning optical system, in the case of the multi-beam, an angle of a ray of light which enters a light deflector affects displacement of a writing-out location among light emission points due to displacement of the focus of a scanning system, and thus, it is necessary that the stop be provided in proximity to the light deflector. Therefore, in the case of the multi-beam, because the location of the stop is limited when the structure disclosed in Japanese Patent No. 3170798 is employed, it is difficult to provide the stop in proximity to the light deflector.

SUMMARY OF THE INVENTION

The present invention has been made to solve the problem described above, and an object of the present invention is to provide a scanning optical system configured to, in the case of a multi-beam, control a focal length of an optical component so that intensity of light at an edge of a stop is equal to or more than a predetermined level, and secure a width of a depth of a focus, and still, realize reduced costs, higher definition, and enhanced speed.

In order to achieve the above-mentioned object, according to one embodiment of the present invention, there is provided a scanning optical system, including: a light source including a plurality of light emission points; a light deflector for deflecting a light beam in a main scanning direction; an optical element for guiding the light beam emitted from the light source to the light deflector; and a stop for blocking a part of the light beam emitted from the optical element and guided by the light deflector, the following expression being satisfied:

$$\left|\frac{(L_x - 2f_{col})y_{LD}}{f_{col}}\right| \geq 0.2$$

where $L_x$ is a distance (mm) from the light source to the stop, $f_{col}$ is a focal length (mm) of the optical element, and $y_{LD}$ is a distance (mm) in the main scanning direction between an optical axis of the optical element and a light emission point among the plurality of light emission points, which is farthest from the optical axis of the optical element in the main scanning direction, the following expression being satisfied:

$$\tan\left(\frac{FFP_y}{2}\right) \geq \frac{D_y}{2f_{col}}$$

where $D_y$ is a diameter (mm) of an aperture of the stop in the main scanning direction, and $FFP_y$ is a total angle at half maximum (degree) of a far-field pattern of light emitted from the light source, the light emission point which is farthest from the optical axis of the optical element in the main scanning direction satisfying:

$$\exp\left(-4(\ln 2)\left(\frac{\phi_y}{FFP_y}\right)^2\right) \geq 0.27$$

when an angle (degree) $\phi_y$ between a marginal ray within a main scanning section of the light beam emitted from the light source and a ray of light of a maximum intensity is defined as follows.

$$\phi_y = \tan^{-1}\left(\frac{0.5 D_y + \frac{(L_x - 2f_{col})y_{LD}}{f_{col}}}{f_{col}}\right)$$

According to one embodiment of the present invention, it is possible to provide the scanning optical system configured to secure the width of the depth of the focus, and still, realize reduced costs, higher definition, and enhanced speed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Note that, in the following description, a main scanning direction is a direction perpendicular to a rotation axis (or oscillation axis) of a light deflector and to an optical axis of an imaging optical system (direction in which a light beam is reflected to be deflected (deflected to be scanned) by the light deflector). A sub scanning direction is a direction in parallel with the rotation axis (or oscillation axis) of the light deflector. A main scanning section is a plane including the optical axis of the imaging optical system and the main scanning direction. A sub scanning section is a section including the optical axis of the imaging optical system and perpendicular to the main scanning section. An exposure distribution in the sub scanning direction is prepared by moving (rotating) a photosensitive member in the sub scanning direction for every main scanning exposure.

[First Embodiment]

A first embodiment of the present invention is described in detail in the following with reference to FIG. 1 to FIG. 6B.

Figure 1:
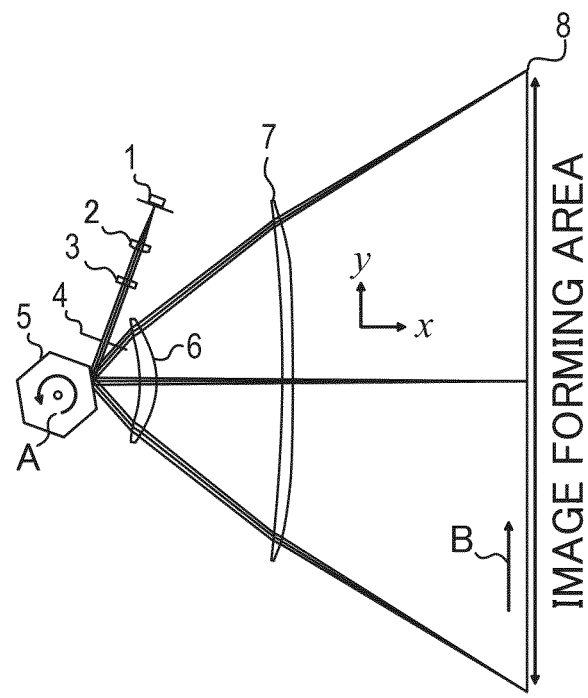
FIG. 1 is a schematic view illustrating a scanning optical system according to a first embodiment of the present invention.
Figure 2:
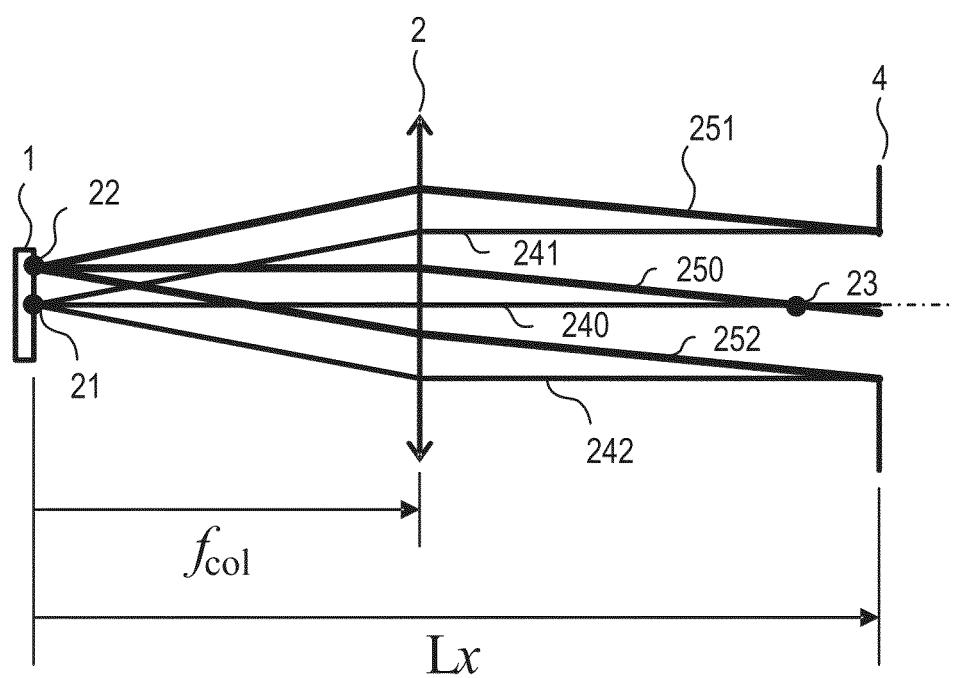
FIG. 2 is a simplified enlarged view of a portion from a light source to a stop of FIG. 1.
Figure 3A:
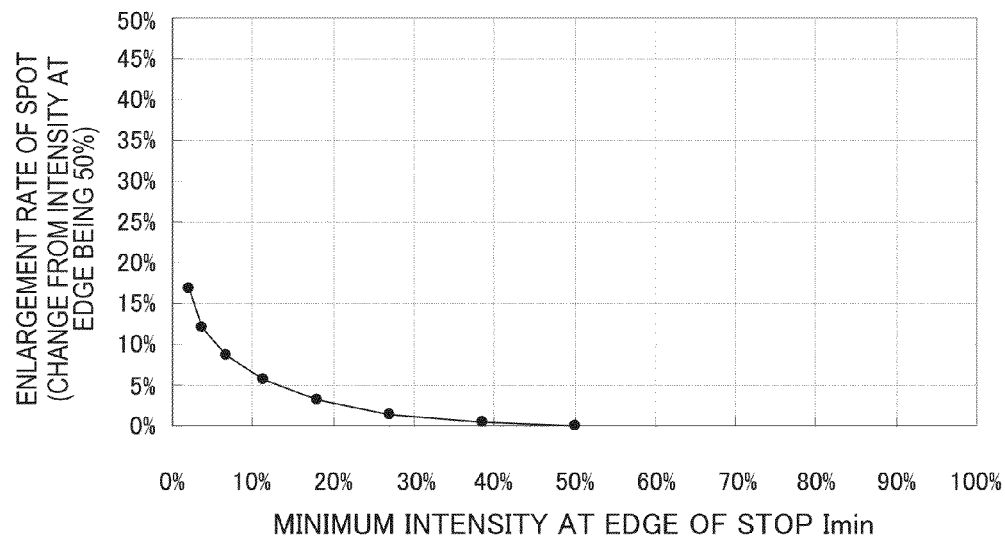
FIG. 3A is a graph showing an enlargement rate of a spot diameter versus a minimum intensity at an edge of a stop 4.
Figure 3B:
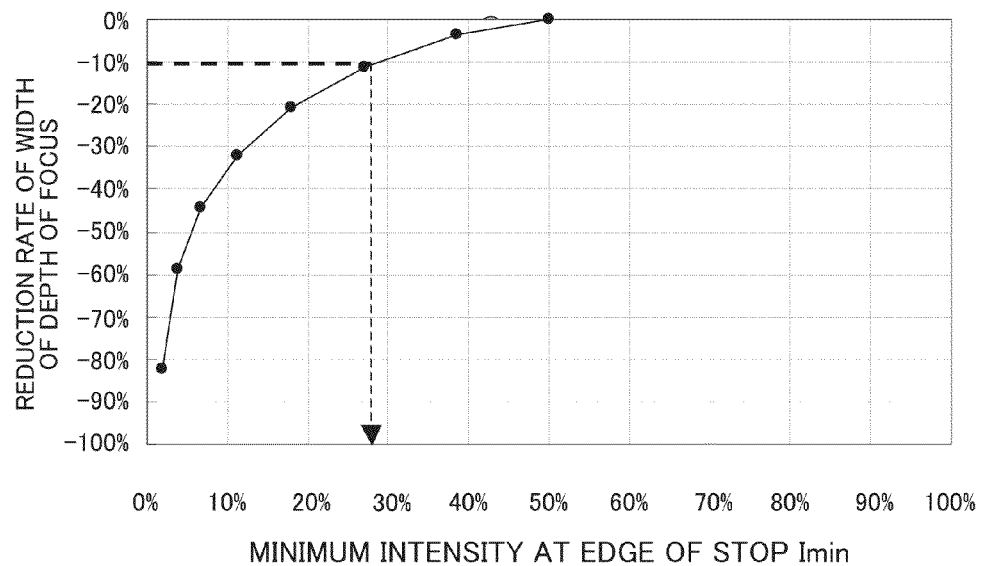
FIG. 3B is a graph showing a reduction rate of a width of a depth of a focus versus the minimum intensity at the edge of the stop 4.
Figure 4:
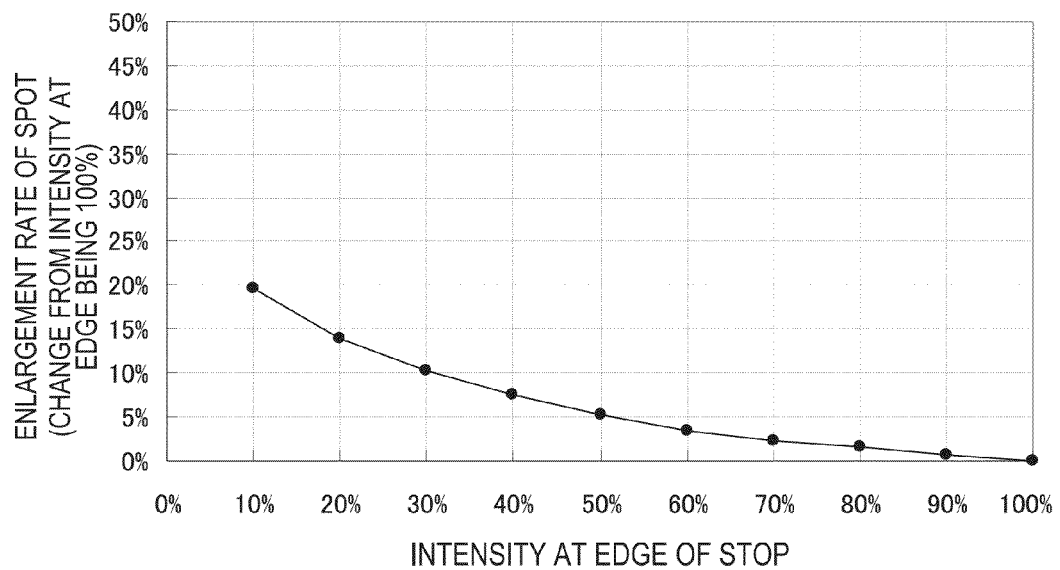
FIG. 4 is a graph showing the enlargement rate of the spot diameter versus an intensity at the edge of the stop 4.
Figure 5:
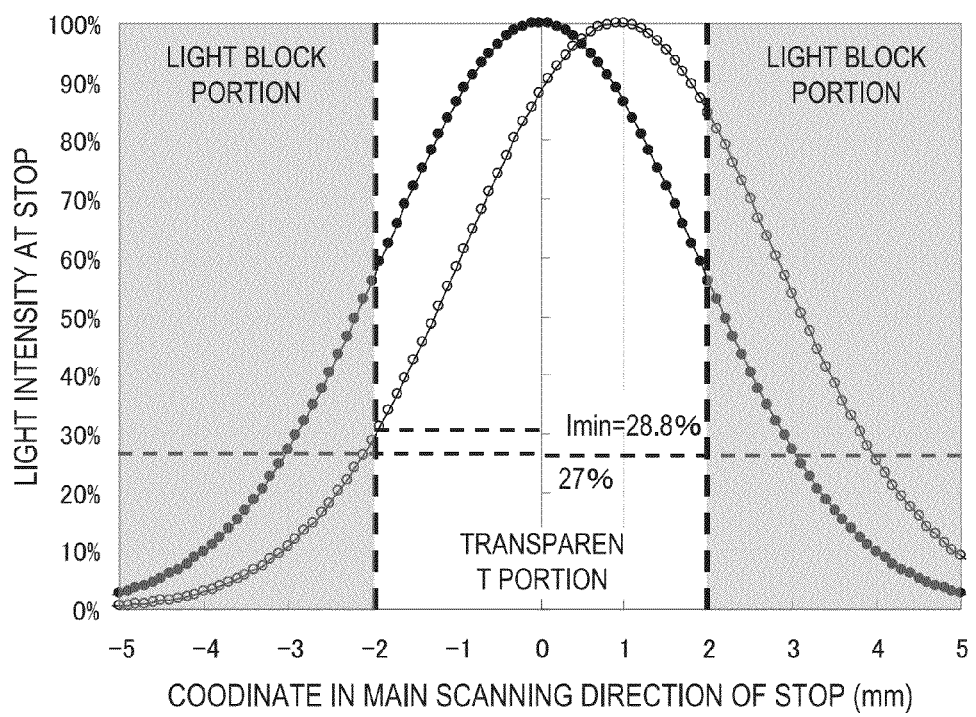
FIG. 5 is a graph showing an intensity distribution at the stop 4.
Figure 6A:
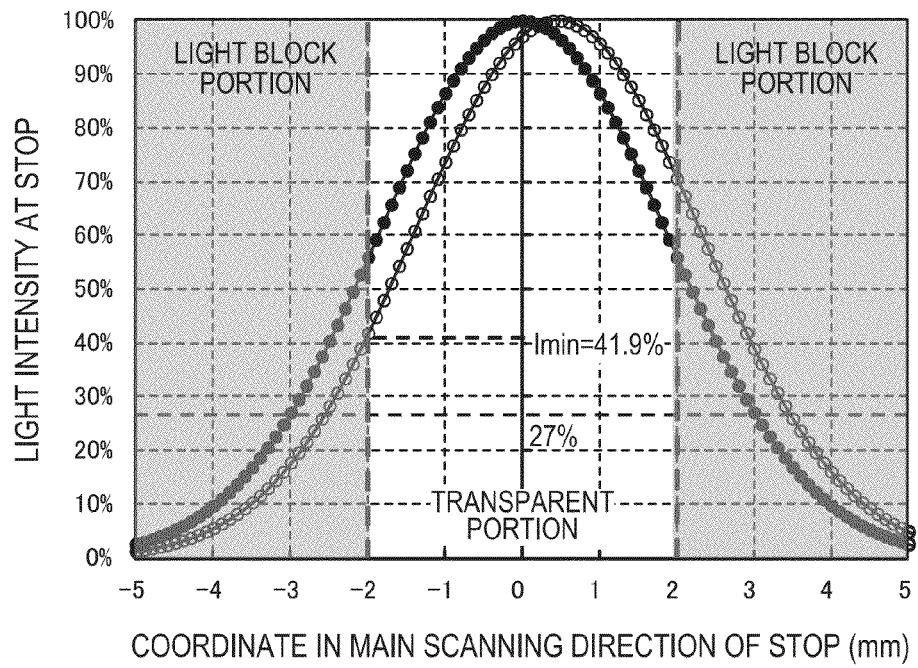
FIG. 6A is a graph showing the intensity distribution at the stop 4 in a modified example of the first embodiment.
Figure 6B:
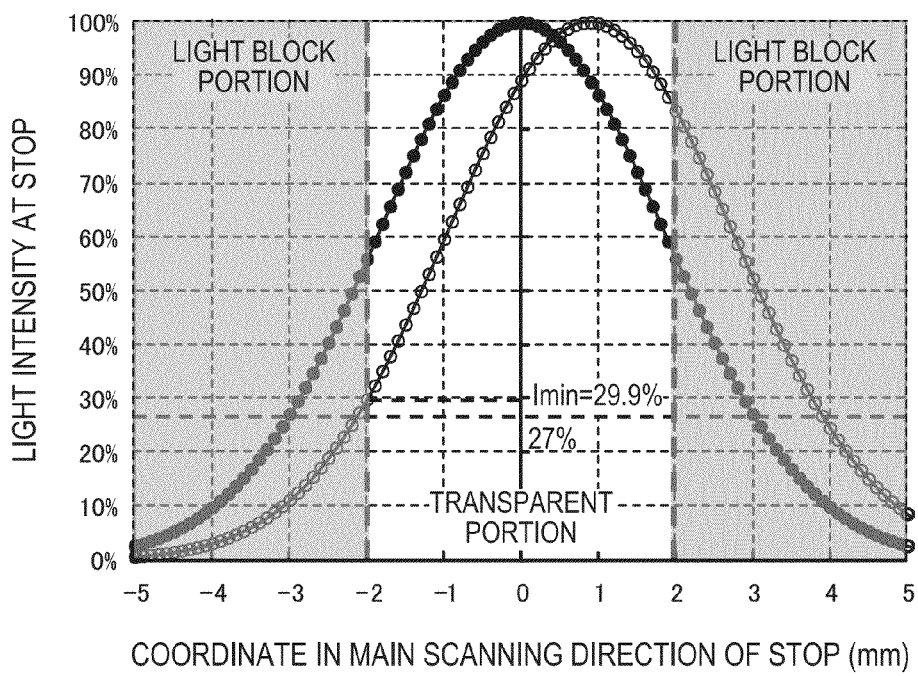
FIG. 6B is a graph showing the intensity distribution at the stop 4 in the modified example of the first embodiment.

FIG. 1 is a schematic view illustrating a scanning optical system according to the first embodiment of the present invention. FIG. 2 is a simplified enlarged view of a portion from a light source to a stop of FIG. 1. FIGS. 3A and 3B are graphs showing an enlargement rate of a spot diameter and a reduction rate of a width of a depth of a focus, respectively, versus a minimum intensity at an edge of a stop 4. FIG. 4 is a graph showing the enlargement rate of the spot diameter versus an intensity at the edge of the stop 4. FIG. 5 is a graph showing an intensity distribution at the stop 4. FIGS. 6A and 6B show a modified example of the first embodiment. FIG. 6A is a graph showing a design intensity distribution at the stop 4, and FIG. 6B is a graph showing the intensity distribution at the stop 4 when there is a tolerance.

With reference to FIG. 1, a light source 1 includes a plurality of light emission points arranged one-dimensionally. Each of the light emission points is a light source for emitting light having an intensity distribution which is not uniform in a direction perpendicular to an emission direction. The light source 1 is, for example, an edge emission type laser or a VCSEL which is a surface emission type semiconductor laser. An optical element (collimator lens) 2 has positive power, and converts light beams emitted from the light source 1 into substantially parallel light beams. "Substantially parallel" as used herein means to include light beams which diverge to some extent and light beams which converge to some extent, with an angle difference of marginal rays being 5 degrees or less.

A cylindrical lens 3 has finite power (refractive power) only in the sub scanning direction (within the sub scanning section). The aperture stop 4 forms a light beam emitted from the collimator lens 2 into an optimum beam shape. A light deflector 5 is rotated by a drive unit (not shown) such as a motor at a uniform speed in a fixed direction (direction of an arrow A in the figure). Imaging lenses (anamorphic lenses) 6 and 7 have different powers between within the main scanning section and within the sub scanning section. A surface 8 to be scanned is a photosensitive member such as a photosensitive drum, and light scans in a direction of an arrow B in the figure.

In this embodiment, light beams emitted from the light source 1 such as a semiconductor laser are converted into substantially parallel light beams by the optical element 2 such as a collimator lens. Then, the light beams are converted by the cylindrical lens 3 into light beams which converge in proximity to a deflecting surface within the sub scanning section. The stop 4 such as an aperture stop limits the light beam diameter, and then, the light beams enter the light deflector 5 such as a polygonal mirror.

Then, the light beams enter a second optical system in which the light beams deflected by the light deflector 5 pass through the anamorphic lenses 6 and 7 and scan the surface 10 to be scanned such as a photosensitive drum at a uniform speed. The light deflector 5 rotates in the direction of the arrow A, and the surface 10 to be scanned is scanned in the direction of the arrow B.

The scanning optical system of the present invention includes a light source including a plurality of light emission points for emitting light each having a nonuniform intensity distribution, an optical element having positive power, which a light beam emitted from the light source enters, a stop for blocking a part of the light beam emitted from the optical element, and a light deflector for deflecting the light beam that passes through the stop. The scanning optical system satisfies:

$$\left| \frac{(L_x - 2f_{col})y_{LD}}{f_{col}} \right| \geq 0.2 \quad (1)$$

where $L_x$ is a distance (mm) from the light source 1 to the stop 4, $f_{col}$ is a focal length (mm) of the optical element 2, and $y_{LD}$ is a distance (mm) in the main scanning direction from an intersection point of an optical axis of the optical element 2 and the light source 1 at a light emission point of the light source 1 which is at the farthest location in the main scanning direction from the optical axis of the optical element 2. Further, the scanning optical system of the present invention satisfies:

$$\tan\left(\frac{FFP_y}{2}\right) \geq \frac{D_y}{2f_{col}} \quad (2)$$

where $D_y$ is a diameter (mm) of an aperture of the stop 4 in the main scanning direction, and $FFP_y$ is a total angle at half maximum (degree) of a far-field pattern of light emitted from the light emission point of the light source 1.

The light emission point which is farthest in the main scanning direction satisfies:

$$\exp\left(-4(\ln 2)\left(\frac{\phi_y}{FFP_y}\right)^2\right) \geq 0.27 \quad (3)$$

where $\phi_y$ is an angle (degree) between a marginal ray within the main scanning section at the light emission point of the light source 1 and a ray of light of a maximum intensity, which is defined as follows.

$$\phi_y = \tan^{-1}\left(\frac{0.5D_y + \frac{(L_x - 2f_{col})y_{LD}}{f_{col}}}{f_{col}}\right) \quad (4)$$

Table 1 shows characteristics of the incident optical system of this embodiment, and Table 2 shows characteristics of the scanning optical system of this embodiment.

An intersection point of each lens surface and the optical axis is regarded as an origin point. A direction of the optical axis is an X axis. An axis orthogonal to the optical axis within the main scanning section is a Y axis. An axis orthogonal to the optical axis within the sub scanning section is a Z axis.

The optical element 2 is a rotationally symmetrical lens, and is a glass molded lens having an aspherical shape for the purpose of correcting aberration. The shape of the optical element 2 is expressed by:

$$x = \frac{\frac{\sqrt{y^2+z^2}}{R}}{1+\sqrt{1-(1+k)\left(\frac{\sqrt{y^2+z^2}}{R}\right)^2}} + C_2(y^2+z^2) + C_4(y^2+z^2)^2 + C_6(y^2+z^2)^3 \quad (5)$$

where R is a radius of curvature, k is an eccentricity, and $C_i$ (i=2, 4, 6) is an aspherical coefficient.

Aspherical shapes within the main scanning section of lens surfaces of the anamorphic lens 6 and the anamorphic lens 7 are expressed by:

$$x = \frac{y^2/R}{1+\left(1-(1+k)(y/R)^2\right)^{1/2}} + \sum_{i=4}^{16} B_i y^i \quad (6)$$

where R is a radius of curvature, k is an eccentricity, and $B_i$ (i=4, 6, 8, 10, . . . ) is an aspherical coefficient.

Here, when a plus side (light source side in Tables) and a minus side (side opposite to light source in Tables) of the Y axis have different coefficients, an index u is attached to the coefficient on the plus side, and an index 1 is attached to the coefficient on the minus side.

Further, aspherical shapes within the sub scanning section of a lens incidence surface and of a lens exiting surface of the anamorphic lens 6 and of a lens incidence surface of the anamorphic lens 7 are expressed by:

$$S = \frac{z^2/r'}{1+\left(1-(z/r')^2\right)^{1/2}} \quad (7)$$

where S is a sagittal line shape defined within a plane which includes a plane normal to a lens surface at an arbitrary point on a meridional line and which is perpendicular to the main scanning section.

Here, a radius of curvature r' within the sub scanning section continuously changes depending on a Y-coordinate of the lens surface, and is expressed by as follows.

$$r' = r\left(1 + \sum_{j=2}^{10} D_j y^j\right) \quad (8)$$

The aspherical shape within the sub scanning section on the exiting surface of the anamorphic lens 7 is expressed by:

$$S = \frac{z^2/r'}{1 + \left(1 - (z/r')^2\right)^{1/2}} \quad (9)$$

where S is a sagittal line shape defined within a plane which includes a plane normal to a lens surface at an arbitrary point on the meridional line and which is perpendicular to the main scanning section.

Here, the radius of curvature r' within the sub scanning section continuously changes depending on a Y-coordinate of the lens surface, and is expressed by:

$$\frac{1}{r'} = \frac{1}{r} + \sum_{j=2}^{10} D_j y^j \quad (10)$$

In Expression. (7) to Expression. (10), r is a radius of curvature within the sub scanning section on the optical axis, and $D_j$ (j=2, 4, 6, 8, 10, . . . ) is a varying coefficient of the radius of curvature within the sub scanning section.

Here, when the plus side (light source side in Tables) and the minus side (side opposite to light source in Tables) of the Y axis have different coefficients, the index u is attached to the coefficient on the plus side, and the index l is attached to the coefficient on the minus side.

Further, the sub scanning section is in an aspherical shape and continuously changed depending on a Y-coordinate of the lens surface, and the shape is expressed by a tenth-order function of Y.

Note that, in Tables 1, 2A and 2B, "E-x" means "x10$^{-x}$".

TABLE 1

| Characteristics of light source 1 | | |
|---|---|---|
| Number of light emission points | N | 32 |
| Arrangement | (dimension) | 1 |
| Pitch | pitch(mm) | 0.05 |
| Wavelength | λ(nm) | 670 |
| Total angle at half maximum in main scanning direction | FFPy(°) | 10 |
| Total angle at half maximum in sub scanning direction | FFPz(°) | 10 |
| Tilt in main scanning direction | Ytilt(°) | 0 |
| Tilt in sub scanning direction | Ztilt(°) | 0 |
| Refractive index | | |
| Optical element 2 | N2 | 1.58 |
| Cylindrical lens 3 | N3 | 1.53 |

| Shape of optical element 2 and cylindrical lens 3 | | Main scanning direction | Sub scanning direction | Aspherical coefficient of optical element 2 | Incidence surface | Exiting surface |
|---|---|---|---|---|---|---|
| Curvature of incidence surface of optical element 2 | r2a(mm) | −100 | −100 | K | 0 | 0 |
| Curvature of exiting surface of optical element 2 | r2b(mm) | 16.62 | 16.62 | C2 | 0 | 0 |
| Curvature of incidence surface of cylindrical lens 3 | r3a(mm) | ∞ | −30.26 | C4 | 0 | −2.30E−05 |
| Curvature of exiting surface of cylindrical lens 3 | r3b(mm) | ∞ | ∞ | C6 | 0 | −5.84E−08 |

| Focal length | | |
|---|---|---|
| Optical element 2 | fcol(mm) | 25 |
| Cylindrical lens 3 | fcyl(mm) | 57 |
| Detection optical system, arrangement | | |
| Light source 1~lens incidence surface 2a | d0(mm) | 22.8 |
| Lens incidence surface 2a~lens Exiting surface 2b | d1(mm) | 3.98 |
| Lens exiting surface 2b~lens incidence surface 3a | d2(mm) | 17.22 |
| Lens incidence surface 3a~lens exiting surface 3b | d3(mm) | 3 |
| Lens exiting surface 3b~stop 4 | d4(mm) | 33 |
| Stop 4~polygonal deflecting surface 5a | d5(mm) | 22.5 |
| Light source 1~polygonal deflecting surface 5a | d total1(mm) | 102.5 |

TABLE 2A fθ coefficient, scanning width, angle of view

| | | |
|---|---|---|
| fθ coefficient | k(mm/rad) | 200 |
| Scanning width | W(mm) | 335 |
| Maximum angle of view | θ(deg) | 48 |

Wavelength, refractive index

| | | |
|---|---|---|
| Wavelength used | λ(nm) | 670 |
| Anamorphic lens 6 refractive index | N1 | 1.5273 |
| Anamorphic lens 7 refractive index | N2 | 1.5273 |

Scanning optical system, arrangement

| | | |
|---|---|---|
| Polygonal deflecting surface 5a~lens incidence surface 6a | d6(mm) | 26.5 |
| Lens incidence surface 6a~lens exiting surface 6b | d7(mm) | 9.6 |
| Lens exiting surface 6b~lens incidence surface 7a | d8(mm) | 67.9 |
| Lens incidence surface 7a~lens exiting surface 7b | d9(mm) | 5.5 |
| Lens exiting surface 7b~surface 8 to be scanned | d10(mm) | 126.74 |
| Polygonal deflecting surface 5a~surface 8 to be scanned | d total2(mm) | 236.24 |

Incident angle (incident optical system)

| | | |
|---|---|---|
| Main scanning direction, incident angle | α(deg) | 70 |

TABLE 2B

Anamorphic lens 6, meridional line shape

| | Incidence surface 6a<br>Light source side | Exiting surface 6b<br>Light source side |
|---|---|---|
| R | −7.12389E+01 | −4.14980E+01 |
| ku | 2.17680E+00 | 6.42947E−02 |
| B4u | 3.69128E−06 | 2.77878E−06 |
| B6u | 8.27275E−11 | 1.17980E−09 |
| B8u | 1.95630E−13 | 2.10270E−13 |
| B10u | 3.54758E−17 | 2.07452E−16 |

| | Side opposite to<br>light source | Side opposite to<br>light source |
|---|---|---|
| kl | 2.17680E+00 | 6.42947E−02 |
| B4l | 3.69128E−06 | 2.77878E−06 |
| B6l | 8.27275E−11 | 1.17980E−09 |
| B8l | 1.95630E−13 | 2.17551E−13 |
| B10l | 3.54758E−17 | 2.02442E−16 |

Anamorphic lens 6, sagittal line shape

| | Incidence surface 6a<br>Light source side | Exiting surface 6b<br>Light source side |
|---|---|---|
| r | −1.00000E+03 | −1.00000E+03 |
| D2u | 0 | 0 |
| D4u | 0 | 0 |
| D6u | 0 | 0 |
| D8u | 0 | 0 |
| D10u | 0 | 0 |

| | Side opposite to<br>light source | Side opposite to<br>light source |
|---|---|---|
| D2l | 0 | 0 |
| D4l | 0 | 0 |
| D6l | 0 | 0 |
| D8l | 0 | 0 |
| D10l | 0 | 0 |

Anamorphic lens 7, meridional line shape

| | Incidence surface 7a<br>Light source side | Exiting surface 7b<br>Light source side |
|---|---|---|
| R | −8.24438E+02 | 7.68000E+02 |
| ku | 0 | −5.89704E+02 |
| B4u | 0 | −2.57008E−07 |
| B6u | 0 | 2.17131E−11 |
| B8u | 0 | −1.47843E−11 |
| B10u | 0 | 4.78126E−20 |

| | Side opposite to<br>light source | Side opposite to<br>light source |
|---|---|---|
| kl | 0 | −5.89704E+02 |
| B4l | 0 | −2.57008E−07 |
| B6l | 0 | 2.17131E−11 |
| B8l | 0 | −1.47843E−11 |
| B10l | 0 | 4.78126E−20 |

Anamorphic lens 7, sagittal line shape

| | Incidence surface 7a<br>Light source side | Exiting surface 7b<br>Light source side |
|---|---|---|
| r | −1.00000E+02 | −2.36478E+01 |
| D2u | 0 | 7.00884E−05 |
| D4u | 0 | −1.56168E−08 |
| D6u | 0 | 2.15646E−12 |
| D8u | 0 | −1.68590E−16 |
| D10u | 0 | 5.61186E−21 |

| | Side opposite to<br>light source | Side opposite to<br>light source |
|---|---|---|
| D2l | 2.45000E−06 | 1.25282E−04 |
| D4l | −1.68000E−10 | −1.52826E−08 |
| D6l | 0 | 2.83271E+12 |
| D8l | 0 | −3.04294E−16 |
| D10l | 0 | 1.06411E−20 |

Effects of the present invention are described in detail with reference to FIG. 2.

With reference to FIG. 2, the optical element 2 is a thin lens at a principal plane location, and the cylindrical lens 3 does not have power in the main scanning direction, and thus, is omitted for the sake of simplicity of description, but a structure illustrated in FIG. 2 may be thought to be optically substantially equivalent to an actual structure.

A center point 21 of the light source 1 is located at an intersection point of the optical axis of the optical element 2 and the light source 1. This point is treated as a reference point even when a light emission point does not actually exist there, and thus, may be treated as a virtual light emission point.

An edge light emission point 22 of the light source 1 is a light emission point which is at the farthest location from the center point 21. This point is an actual light emission point.

A focal point 23 of the optical element 2 is at a focal point location on an image side.

An intensity center line 240 is a ray of light of a maximum intensity emitted from the light emission point 21. A ray of light 241 is a marginal ray emitted from the light emission point 21, and is a ray of light on a positive side in the main scanning direction. A ray of light 242 is a marginal ray emitted from the light emission point 21, and is a ray of light on a negative side in the main scanning direction.

An intensity center line 250 is a ray of light of a maximum intensity emitted from the edge light emission point 22. A ray of light 251 is a marginal ray emitted from the edge light emission point 22, and is a ray of light on the positive side in the main scanning direction. A ray of light 252 is a marginal ray emitted from the edge light emission point 22, and is a ray of light on the negative side in the main scanning direction.

First, the following Expression (1) which is a characteristic of the scanning optical system of the present invention is described:

$$\left|\frac{(L_x - 2f_{col})y_{LD}}{f_{col}}\right| \geq 0.2 \qquad (1)$$

where $L_x$ is the distance (mm) from the light source 1 to the stop 4, $f_{col}$ is the focal length (mm) of the optical element 2, and $y_{LD}$ is the distance (mm) in the main scanning direction from the intersection point of the optical axis of the optical element 2 and the light source 1 at the light emission point of the light source 1 which is at the farthest location in the main scanning direction from the optical axis of the optical element 2.

The intensity center line 250 from the edge light emission point 22 of the light source 1 is refracted by the optical element 2, passes through the focal point 23, and then reaches the stop 4.

In this case, an amount $\Delta y$ of displacement of the intensity center line 250 from a center of the stop 4 is determined by:

$$\Delta y = \frac{(L_x - 2f_{col})y_{LD}}{f_{col}} \qquad (11)$$

where $L_x$ is the distance (mm) from the light source 1 to the stop 4, $f_{col}$ is the focal length (mm) of the optical element 2, and $y_{LD}$ is the distance (mm) in the main scanning direction from the intersection point of the optical axis of the optical element 2 and the light source 1 at the light emission point of the light source 1 which is at the farthest location in the main scanning direction.

As the distance between the focal point 23 on the image side of the optical element 2 and the stop 4 becomes larger, and, as the distance between the edge light emission point 22 and the center point 21 becomes larger, the amount $\Delta y$ of displacement of the intensity center line 250 from the center of the stop 4 becomes larger. As the amount $\Delta y$ of displacement becomes larger, the extent of asymmetry of the intensity distribution after the light beam passes through the stop 4 becomes larger, resulting in, as described below with reference to FIGS. 3A and 3B, an increased spot diameter (FIG. 3A) and a reduced depth of the focus (FIG. 3B). In particular, according to the present invention, in a structure in which the amount $\Delta y$ of displacement is 0.2 or more, remarkable effects that increase in spot diameter is inhibited and the width of the depth of the focus is secured can be obtained.

In the scanning optical system, in the case of a four-beam type which is generally used, when, for example, the pitch of the light emission points is 100 μm, the distance $y_{LD}$ from the center point 21 to the edge light emission point 22 is 150 μm.

In this case, when calculation is performed using a focal length of the optical element 2 of 25 mm and a distance from the light source 1 to the stop 4 of 80 mm in this embodiment, the left side of Expression (1) is 0.18, which is smaller than 0.20. However, when the used light source 1 has 32 light emission points in order to accommodate enhanced speed as in this embodiment, even when the pitch of the light emission points is 50 μm, the distance $y_{LD}$ from the center point 21 to the edge light emission point 22 is 775 μm. In this case, when calculation is performed using the focal length of the optical element 2 of 25 mm and the distance from the light source 1 to the stop 4 of 80 mm in this embodiment, from Expression (11), the amount $\Delta y$ of displacement is 0.93, and the left side of Expression (1) is larger than 0.2.

Next, the following Expression (2) is described:

$$\tan\left(\frac{FFP_y}{2}\right) \geq \frac{D_y}{2f_{col}} \qquad (2)$$

where $D_y$ is the diameter (mm) of the stop 4 in the main scanning direction, $FFP_y$ is the total angle at half maximum (degree) of the far-field pattern of light emitted from the light emission point of the light source 1, and $f_{col}$ is the focal length (mm) of the optical element 2. This expression is a conditional expression for a light beam emitted from the center point 21 of the light source 1.

When a system in which an intensity distribution of light beams passing through the stop 4 is uniform in a direction perpendicular to a travelling direction of the light beams is regarded as ideal, at that time, the intensity at an edge of the light beams on the stop 4 is 100% with respect to the intensity at the center.

On the other hand, as far as a semiconductor laser is used, emitted light beams have an intensity distribution which is called a far-field pattern (FFP). Generally, in a related-art edge emission type semiconductor laser, the total angle at half maximum (full width of emission angles at which the intensity is 50%) of the FFP is larger than 10 degrees. In the case of a surface emission type semiconductor laser as used in this embodiment, due to a structural reason, the total angle at half maximum of the FFP is often 10 degrees or smaller and, compared with an edge emission type semiconductor laser, a surface emission type semiconductor laser tends to have a smaller total angle at half maximum of the FFP.

Therefore, as an F-number of the optical element 2 becomes smaller, the intensity at the edge on the stop becomes lower. When the intensity at the edge on the stop becomes lower, as shown in FIG. 4, the spot diameter gradually increases.

Normally, when a size of the stop is determined, the F-number of the optical system is also determined, and thus, the spot diameter is uniquely determined. However, when the intensity at the edge on the stop varies, an effective F-number changes, and thus, difference in the intensity at the edge of the light beams passing through the stop affects the spot diameter.

With reference to FIG. 4, when increase in the spot diameter is allowed to be up to 5%, it is necessary to secure an intensity of the FFP at the edge of the stop of 50% or more.

In this embodiment, in order to secure the intensity at the edge of the light beams on the stop 4 of 50% or more, it is necessary that the following expression be satisfied:

$$\tan\left(\frac{FFP_y}{2}\right) \geq \frac{1}{2F_{no}} = \frac{D_y}{2f_{col}} \qquad (12)$$

where $FFP_y$ is the total angle at half maximum)(°) of light emitted from the light source 1 in the main scanning direction, $F_{no}$ is an F-number of the optical element 2, and $D_y$ is a diameter (mm) of the stop 4 in the main scanning direction.

In this embodiment, $FFP_y$ is 10°, $D_y$ is 4 mm, and $f_{col}$ is 25 mm, and thus, the left side of Expression (2) is 0.087 and the right side of Expression (2) is 0.080, and Expression (2) is satisfied. In this embodiment, with regard to the spot diameter on the axis, the spot diameter in an ideal case in which the intensity distribution is uniform is 46.9 μm. On the other hand, the spot diameter when the FFP is taken into consideration is 49.1 μm. In this case, the enlargement rate is 4.69%. As described above, by structuring the scanning optical system so that Expression (2) is satisfied, the enlargement rate of the spot diameter of the light beam emitted from a light emission point of the light source 1 which is farthest from the optical axis of the optical element 2 in the main scanning direction relative to the spot diameter of a light beam emitted from the center point 21 of the light source 1 of an ideal system can be limited to 5% or less.

Finally, description is made with regard to Expression (3):

$$\exp\left(-4(\ln 2)\left(\frac{\phi_y}{FFP_y}\right)^2\right) \geq 0.27 \tag{3}$$

where $\phi_y$ is an angle (degree) between the marginal ray in the main scanning direction at a light emission point of the light source 1 and a ray of light of a maximum intensity, and is defined as follows.

$$\phi_y = \tan^{-1}\left(\frac{0.5D_y + \frac{(L_x - 2f_{col})y_{LD}}{f_{col}}}{f_{col}}\right) \tag{4}$$

Expression (3) is a conditional expression for a light beam emitted from the edge light emission point 22 which is a light emission point of the light source 1 at the farthest location in the main scanning direction. The ray of light 250 emitted from the edge light emission point 22 of the light source 1 is, at the stop 4, displaced from the center of the stop 4 by Δy in Expression (11). Therefore, as shown in FIG. 5, while the intensity distribution of a light beam emitted from the center point 21 through the stop 4 is symmetrical with respect to the center of the stop, the intensity distribution of a light beam emitted from the edge light emission point 22 through the stop 4 is asymmetrical with respect to the center of the stop. A minimum intensity $I_{min}$ shown in FIG. 5 can be determined by the following Expression (13):

$$I_{min} = \exp\left(-4(\ln 2)\left(\frac{\phi_y}{FFP_y}\right)^2\right) \tag{13}$$

where $\phi_y$ is the larger angle (degree) between the marginal ray in the main scanning direction at the light emission point 22 of the light source 1 and a ray of light of a maximum intensity, and is expressed by Expression (4). As the minimum intensity $I_{min}$ becomes lower, the intensity at the edge of the stop becomes lower, effective $F_{no}$ becomes larger, and thus, optical brightness is reduced. Therefore, as shown in FIGS. 3A and 3B, the spot diameter (FIG. 3A) is increased and the width of the depth of the focus is reduced (FIG. 3B).

Focus fluctuations cause fluctuations of the spot diameter, and thus, in order to bring the depth of the focus into an allowed range, for example, in a small spot type scanning system of 60 μm or less, it is necessary to limit reduction in depth of the focus due to the light emission point intervals to about 10% or less. In order to limit the reduction in depth of the focus to about 10% or less, as can be seen in FIG. 3B, it is necessary to secure the minimum intensity $I_{min}$ of 27% or more. Further, in order to limit the reduction in depth of the focus to 5% or less, as can be seen in FIG. 3B, it is more preferred to secure the minimum intensity $I_{min}$ of 38% or more.

In order to attain this, from Expression (13), it is necessary to determine the structure of the optical system so as to satisfy the following Expression (14).

$$I_{min} = \exp\left(-4(\ln 2)\left(\frac{\phi_y}{FFP_y}\right)^2\right) \geq 0.27 \tag{14}$$

In this embodiment, $FFP_y$ is 10°, $D_y$ is 4 mm, $f_{col}$ is 25 mm, $L_x$ is 80 mm, and $y_{LD}$ is 0.775 mm, and thus, the minimum intensity $I_{min}$ is 28.8% and Expression (3) is satisfied.

In this case, when the image height is zero, a spot diameter of a light beam emitted from the center point 21 is 49.1 μm, and a spot diameter of a light beam emitted from the edge light emission point 22 is 49.6 μm. Therefore, the rate of increase of the spot diameter is 1.01%.

Further, when the image height is zero, the width of the depth of the focus of a light beam emitted from the center point 21 is 6.62 mm in the case of a 60 μm slice, and the width of the depth of the focus of a light beam emitted from the edge light emission point 22 is 5.98 mm. Therefore, the reduction rate of the width of the depth of the focus is 9.67%.

As described above, by structuring the scanning optical system so as to satisfy Expression (3), the reduction rate of the depth of the focus of a light beam emitted from the edge light emission point 22 of the light source 1 with respect to the depth of the focus of a light beam emitted from the center point 21 can be limited to 10% or less.

It is more preferred that, when tolerances of components and assembly are taken into consideration, instead of Expression (14), Expression (15) be used.

$$I_{min} = \exp\left(-4(\ln 2)\left(\frac{\phi_y}{FFP_y}\right)^2\right) \geq 0.40 \tag{15}$$

As shown in FIG. 6A, by setting the minimum intensity $I_{min}$ to be 41.9% in the design distribution, regardless of manufacturing tolerances, as shown in FIG. 6B, the minimum intensity $I_{min}$ can be set to be 29.9%, and Expression (15) can be satisfied under a state in which the tolerances are included. Therefore, even when fluctuations in components and assembly are caused, the width of the depth of the focus can be secured, which is more preferred.

According to the present invention, among light beams emitted from the light source 1, as the location of a light emission point becomes farther from the center point 21, the intensity distribution of a light beam emitted from the light emission point through the stop 4 becomes more asymmetrical, and thus, a light amount after the light beam passes through the stop 4 varies in the respective light emission points. In order to equalize the light amount on the surface 8 to be scanned in the respective light emission points, it is necessary to adjust the light amount in the respective light emission points. In that case, a unit configured to measure the light amount provided in the light source 1 or in the scanning optical system may be used to measure the light amount in the respective light emission points, and the amount of emitted light or a time period during which light is emitted may be adjusted individually and arbitrarily for the respective light emission points in the light source 1.

Further, when the light source 1 is manufactured and installed, there is a possibility that the intensity center line 240 is tilted with respect to the optical axis of the optical element 2. At that time, the light source 1 is adjusted so that the intensity center line 240 is in parallel with the optical axis of the optical element 2.

By the characteristic structure described above, a scanning optical system can be realized which secures a width of a depth of a focus, and still, realizes reduced costs, higher definition, and enhanced speed.

[Second Embodiment]

A second embodiment of the present invention is described in detail in the following with reference to FIG. 7 and FIG. 8.

Figure 7:
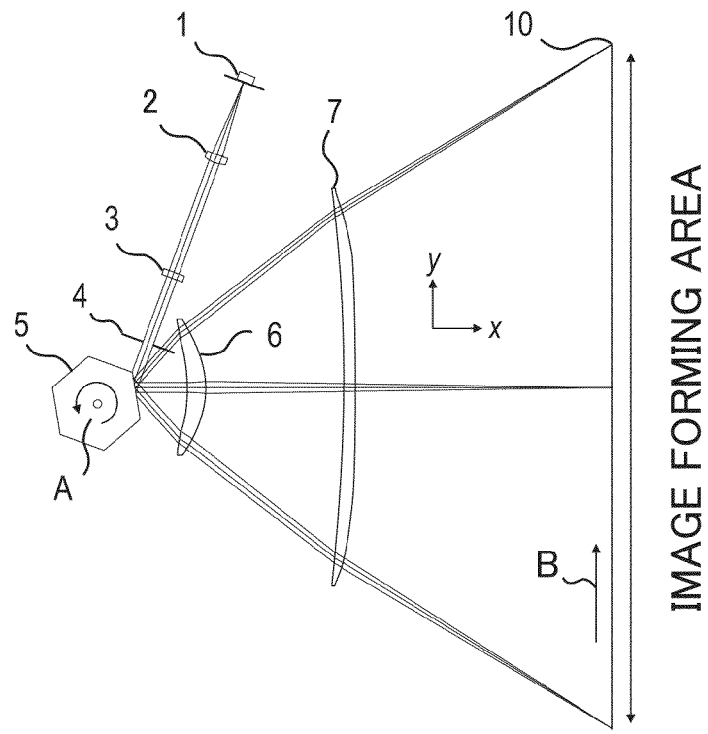
FIG. 7 is a schematic view illustrating a scanning optical system according to a second embodiment of the present invention.
Figure 8:
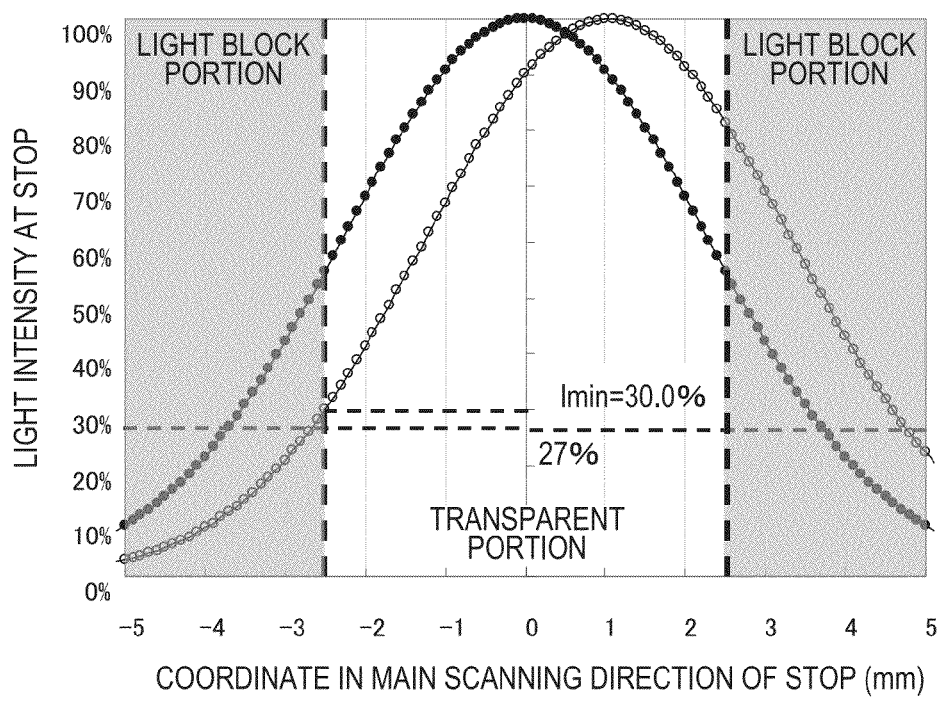
FIG. 8 is a graph showing the intensity distribution at the stop 4 in the second embodiment.

FIG. 7 is a schematic view illustrating a scanning optical system according to the second embodiment of the present invention. FIG. 8 is a graph showing the intensity distribution at the stop 4.

This embodiment is different from the first embodiment in spot diameter.

Table 3 shows characteristics of the incident optical system of this embodiment. The characteristics of the scanning optical system and the expressions of the aspherical surfaces are similar to those of the first embodiment.

Note that, in Table 3, "E-x" means "x10$^{-x}$".

In the incident optical system having the characteristics shown in Table 3, when calculation is performed using the focal length of the optical element 2 of 41 mm and the distance from the light source 1 to the stop 4 of 136.5 mm in this embodiment, the left side of Expression (1) is 1.03, which is larger than 0.2, and thus, Expression (1) is satisfied.

Next, in this embodiment, $FFP_y$ is 7.5°, $D_y$ is 5 mm, and $f_{col}$ is 41 mm, and thus, the left side of Expression (2) is 0.066 and the right side of Expression (2) is 0.061. Thus, Expression (2) is satisfied.

In this embodiment, with regard to the spot diameter on the axis, the spot diameter in an ideal case in which the intensity distribution is uniform is 37.43 μm. On the other hand, the spot diameter when the FFP is taken into consideration is 39.26 μm. In this case, the enlargement rate is 4.89%. As described above, by structuring the scanning optical system so that Expression (2) is satisfied, the enlargement rate with respect to the spot diameter of a light beam emitted from the center point 21 of the light source 1 of an ideal system can be limited to 5% or less.

Finally, the ray of light 250 emitted from the edge light emission point 22 of the light source 1 is, at the stop 4, displaced from the center of the stop 4 by Δy in Expression (11). Therefore, as shown in FIG. 8, while the intensity distribution of a light beam emitted from the center point 21 through the stop 4 is symmetrical with respect to the center of

TABLE 3

Characteristics of light source 1

| | | |
|---|---|---|
| Number of light emission points | N | 32 |
| Arrangement | (dimension) | 1 |
| Pitch | pitch(mm) | 0.05 |
| Wavelength | λ(nm) | 670 |
| Total angle at half maximum in main scanning direction | FFPy(°) | 7.5 |
| Total angle at half maximum in sub scanning direction | FFPz(°) | 7.5 |
| Tilt in main scanning direction | Ytilt(°) | 0 |
| Tilt in sub scanning direction | Ztilt(°) | 0 |

Refractive index

| | | |
|---|---|---|
| Optical element 2 | N2 | 1.58 |
| Cylindrical lens 3 | N3 | 1.53 |

| Shape of optical element 2 and cylindrical lens 3 | | Main scanning direction | Sub scanning direction | Aspherical coefficient of optical element 2 | | |
|---|---|---|---|---|---|---|
| | | | | | Incidence surface | Exiting surface |
| Curvature of incidence surface of optical element 2 | r2a(mm) | −165 | −165 | K | 0 | 0 |
| Curvature of exiting surface of optical element 2 | r2b(mm) | 27.53 | 27.53 | C2 | 0 | 0 |
| Curvature of incidence surface of cylindrical lens 3 | r3a(mm) | ∞ | −30.26 | C4 | 0 | −5.47E−06 |
| Curvature of exiting surface of cylindrical lens 3 | r3b(mm) | ∞ | ∞ | C6 | 0 | −5.56E−10 |

Focal length

| | | |
|---|---|---|
| Optical element 2 | fcol(mm) | 41 |
| Cylindrical lens 3 | fcyl(mm) | 57 |

Detection optical system, arrangement

| | | |
|---|---|---|
| Light source 1~lens incidence surface 2a | d0(mm) | 39.14 |
| Lens incidence surface 2a~lens exiting surface 2b | d1(mm) | 3.56 |
| Lens exiting surface 2b~lens incidence surface 3a | d2(mm) | 58.8 |
| Lens incidence surface 3a~lens exiting surface 3b | d3(mm) | 3 |
| Lens exiting surface 3b~stop 4 | d4(mm) | 33 |
| Stop 4~polygonal deflecting surface 5a | d5(mm) | 22.5 |
| Light source 1~polygonal deflecting surface 5a | d total1(mm) | 160 | the stop, the intensity distribution of a light beam emitted from the edge light emission point 22 through the stop 4 is asymmetrical. In this embodiment, $FFP_y$ is 7.5°, $D_y$ is 5 mm, $f_{col}$ is 41 mm, $L_x$ is 136.5 mm, and $y_{LD}$ is 0.775 mm, and thus, the minimum intensity $I_{min}$ is 30.0% and Expression (3) is satisfied.

In this case, when the image height is zero, a spot diameter of a light beam emitted from the center point 21 is 39.26 µm, and a spot diameter of a light beam emitted from the edge light emission point 22 is 39.85 µm. Therefore, the rate of increase of the spot diameter is 1.50%.

Further, when the image height is zero, the width of the depth of the focus of a light beam emitted from the center point 21 is 4.18 mm in the case of a 50 µm slice, and the width of the depth of the focus of a light beam emitted from the edge light emission point 22 is 3.87 mm. Therefore, the reduction rate of the width of the depth of the focus is 7.42%. As described above, by structuring the scanning optical system so as to satisfy Expression (3), the reduction rate of the depth of the focus of a light beam emitted from the edge light emission point 22 of the light source 1 with respect to the depth of the focus of a light beam emitted from the center point 21 can be limited to 10% or less.

According to the present invention, among light beams emitted from the light source 1, the farther the location of a light emission point from the center point 21 is, the more asymmetrical the intensity distribution of a light beam emitted from the light emission point through the stop 4 is, and thus, a light amount after the light beam passes through the stop 4 varies in the respective light emission points. In order to equalize the light amount on the surface 8 to be scanned in the respective light emission points, it is necessary to adjust the light amount in the respective light emission points. In that case, a unit configured to measure the light amount provided in the light source 1 or in the scanning optical system may be used to measure the light amount in the respective light emission points, and the amount of emitted light or a time period during which light is emitted may be adjusted individually and arbitrarily for the respective light emission points in the light source 1.

As described above, by the structure in this embodiment, a scanning optical system can be provided which secures a width of a depth of a focus, and still, realizes reduced costs, higher definition, and enhanced speed.

In the embodiments described above, the light source 1 is not limited to a VCSEL. Insofar as the structure satisfies the conditional expression (1), remarkable effects of the present invention can be obtained.

Further, the arrangement in the light source 1 is not limited to a one-dimensional one. Even if the arrangement is a two-dimensional one, insofar as the conditional expression (1) according to claim 1 in the appended claims is satisfied, the effects of the present invention can be obtained.

[Third Embodiment]

A third embodiment of the present invention is described in detail in the following with reference to FIG. 9 and FIG. 10.

Figure 9:
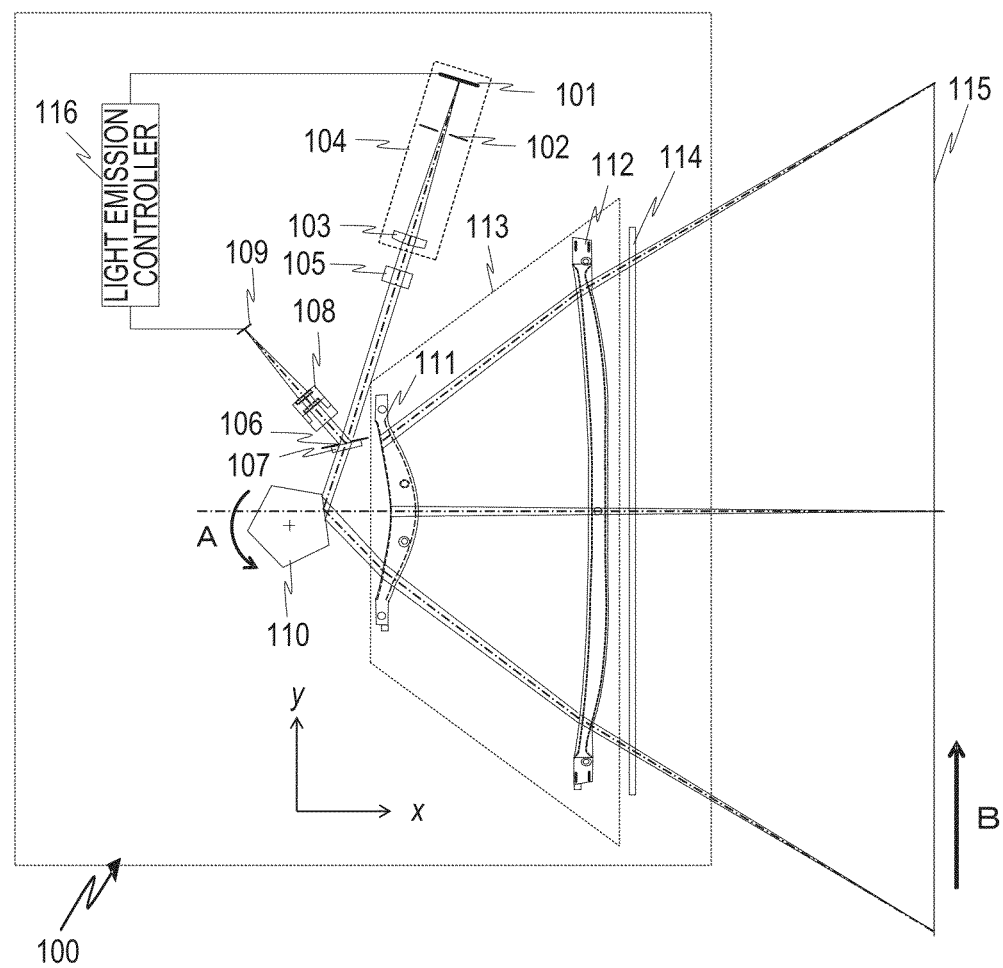
FIG. 9 is a schematic view illustrating a scanning optical system according to a third embodiment of the present invention.
Figure 10:
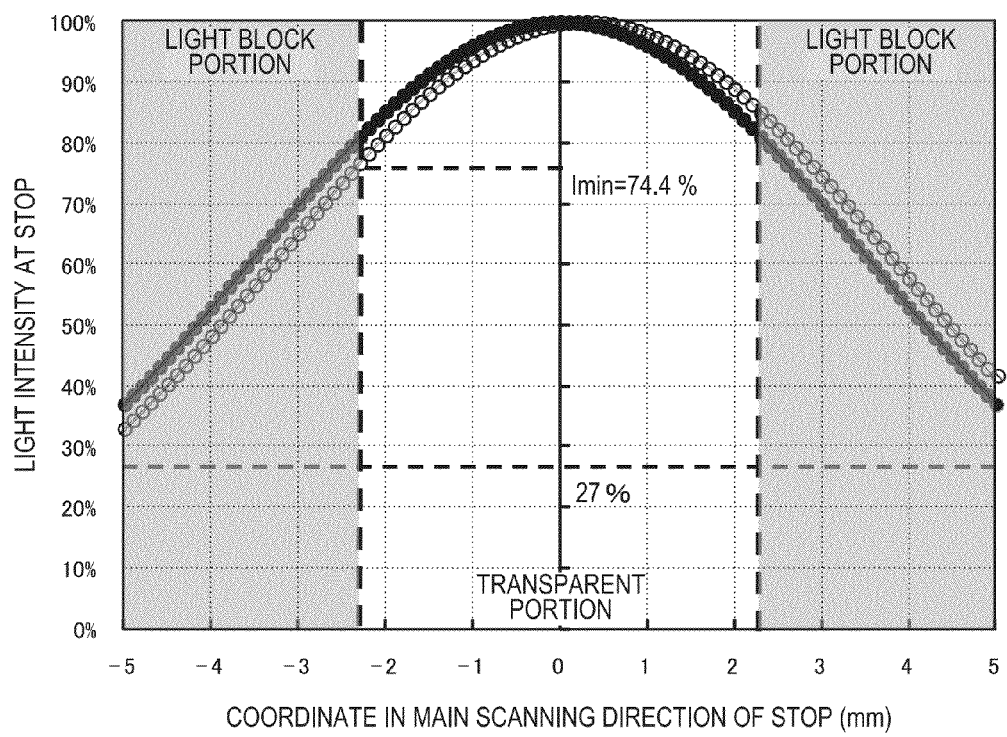
FIG. 10 is a graph showing an intensity distribution at a main scanning stop 105 of the third embodiment.

FIG. 9 is a schematic view illustrating a scanning optical system according to the third embodiment of the present invention. FIG. 10 is a graph showing an intensity distribution at a main scanning stop 106.

This embodiment is different from the first embodiment in including a light beam conversion unit 107 between the main scanning stop 106 and a light deflector 110.

FIG. 9 is a schematic view illustrating a scanning optical system 100 according to the third embodiment of the present invention.

The scanning optical system 100 includes a light source 101, an aperture stop 102, a collimator lens 103, and a cylindrical lens 105. The scanning optical system 100 further includes an aperture stop 106, the light beam conversion unit 107, an anamorphic lens 108, and a light amount detection unit 109.

The scanning optical system 100 further includes the light deflector 110, a first fθ lens 111, a second fθ lens 112, and a dustproof unit 114.

Note that, a surface 115 to be scanned may be a surface of a photosensitive member.

Note that, in the following description, the main scanning direction is a direction perpendicular to a rotation axis of the light deflector 110 and to an optical axis of the first fθ lens 111 and the second fθ lens 112. The sub scanning direction is a direction in parallel with the rotation axis of the light deflector 110. Further, the main scanning section is a plane including the optical axis of the first fθ lens 111 and the second fθ lens 112 and the main scanning direction. The sub scanning section is a section including the optical axis of the first fθ lens 111 and the second fθ lens 112 and perpendicular to the main scanning section. An exposure distribution in the sub scanning direction is prepared by moving (rotating) a photosensitive member in the sub scanning direction for every main scanning exposure.

The light source 101 includes a plurality of light emission points, and, for example, an edge emission type laser or a surface emission type semiconductor laser such as a VCSEL is used.

The aperture stop 102 limits a diameter in the sub scanning direction of a light beam emitted from the light source 101.

The collimator lens 103 is an optical element having positive power, and is an optical element which converts light beams emitted from the light source 101 into substantially parallel light beams. "Substantially parallel" as used herein means to include light beams which diverge to some extent and light beams which converge to some extent, with an angle difference of marginal rays being 5 degrees or less.

The light source 101, the aperture stop 102, and the collimator lens 103 form a laser unit 104. The cylindrical lens 105 has finite power (refractive power) only within the sub scanning section. The aperture stop 106 limits a diameter in the main scanning direction of a light beam emitted from the collimator lens 103.

A light beam from the cylindrical lens 105 enters a light separating element (light separating unit) 107. The light separating element 107 converts a width of an exiting light beam with respect to a width of an incident light beam, and a wedge prism, a beam compressor, or the like is used. Note that, in this embodiment, a wedge prism is used as the light separating element 107. Further, for the purpose of detecting a light amount to be described below, the wedge prism also separates a ray of light into transmitted light and reflected light by using surface reflection thereof and reflecting a part of incident light. The anamorphic lens 108 collects light beams reflected by the wedge prism 107, and the amount of the collected light beams is detected by the light amount detection unit 109. As the light amount detection unit 109, a photodiode, a CMOS sensor, or the like is used, and the detected amount of reflected light is fed back for the purpose of controlling the amount of light to be emitted from the light source 1.

The light deflector 110 is rotated by a drive unit (not shown) such as a motor at a uniform speed in a fixed direction (for example, direction of an arrow A in the figure), and is a polygonal mirror or the like.

The first fθ lens 111 and the second fθ lens 112 are scanning optical elements such as imaging lenses (anamorphic lenses) which have different powers between within the main scanning section and within the sub scanning section. The first fθ lens 111 and the second fθ lens 112 form a scanning optical unit 113 configured to determine fθ characteristics. The dustproof unit 114 is provided for the purpose of preventing entrance of dust and the like into a housing (not shown), and a glass plate or the like is used. The surface 115 to be scanned is a surface of a photosensitive drum or the like, and is scanned in a direction of an arrow B in the figure.

A light emission controller 116 determines, based on information on light emission timing obtained from information on the light amount obtained from the light amount detection unit 109, the amount of light emitted from the light source 101, and controls light emitted to be from the light source 101.

Next, operation of the scanning optical system 100 is described.

First, a plurality of light beams emitted from the plurality of light emission points, respectively, of the light source 101 pass through the aperture stop 102 for limiting the light beams in the sub scanning direction, and are converted into substantially parallel light beams by the collimator lens 103. Then, the light beams are converted by the cylindrical lens 105 into light beams which converge in proximity to a deflecting surface of the light deflector 110 within the sub scanning section. After that, the light beams pass through the aperture stop 106 for limiting the light beams in the main scanning direction. Then, a part of the light beams are reflected by the wedge prism 107, and the rest of the light beams pass therethrough. Note that, in this third embodiment, the light beams enter the wedge prism 107 so as to form an incident angle of 29.28 degrees.

The light beams reflected by the wedge prism 107 enter the anamorphic lens 108, and then enter the light amount detection unit 109. On the other hand, the light beams which pass through the wedge prism 107 enter the light deflector 110 which is rotated in the direction of the arrow A.

Further, the width of the light beams which enter the wedge prism 107 is converted by the effect of the wedge, and the light beams are emitted in the converted state. In this embodiment, the width of the incident light beams is 4.23 mm, and the width of the exiting light beams is 4.03 mm. The light beams which enter the light deflector 110 are deflected to be scanned by the light deflector 110, pass through the first fθ lens 111 and the second fθ lens 112, pass through the dustproof unit 114, and scan the surface 115 to be scanned at a uniform speed. Note that, the light deflector 110 is rotated in the direction of the arrow A, and thus, the deflected and scanned light beams scan the surface 115 to be scanned in the direction of the arrow B.

Next, Tables 4A, 4B, 5A and 5B show characteristics of the incident optical system and characteristics of the scanning optical system, respectively, of this embodiment.

TABLE 4A

| Characteristics of light source 101 | | |
|---|---|---|
| Number of light emission points | N | 32 |
| Arrangement | (dimension) | 1 |
| Pitch | pitch(mm) | 0.05 |
| Wavelength | λ(nm) | 680 |
| Deflection of light incident on deflecting surface of light deflector 110 | | p polarization |
| Total angle at half maximum in main scanning direction | FFPy(°) | 7.93 |
| Total angle at half maximum in sub scanning direction | FFPz(°) | 7.93 |

| Shape of stop | | Main scanning direction | Sub scanning direction |
|---|---|---|---|
| Sub scanning stop 102 | | 4.66 | 0.57 |
| Main scanning stop 106 | | 4.85 | ∞ |

| Refractive index | | |
|---|---|---|
| Collimator lens 103 | N1 | 1.577 |
| Cylindrical lens 105 | N2 | 1.531 |
| Wedge prism 107 | N3 | 1.531 |
| Anamorphic lens 108 | N4 | 1.488 |

| Shape of optical element | | Main scanning direction | Sub scanning direction |
|---|---|---|---|
| Radius of curvature of incidence surface of collimator lens 103 | r1a(mm) | −155.00 | −155.00 |
| Radius of curvature of exiting surface of collimator lens 103 | r1b(mm) | 44.42 | 44.42 |
| Radius of curvature of incidence surface of cylindrical lens 105 | r2a(mm) | ∞ | −48.14 |
| Radius of curvature of exiting surface of cylindrical lens 105 | r2b(mm) | ∞ | ∞ |
| Wedge prism 107 | Apex angle(deg) | 4 | |
| Radius of curvature of incidence surface of anamorphic lens 108 | r3a(mm) | ∞ | −32.00 |
| Radius of curvature of exiting surface of anamorphic lens 108 | r3b(mm) | 17.43 | 17.43 |

| Aspherical coefficient of collimator lens 103 | | Incidence surface | Exiting surface |
|---|---|---|---|
| | K | 0 | 0 |
| | C2 | 0 | 0 |
| | C4 | 0 | −1.7756E−06 |
| | C6 | 0 | −3.7965E−10 |

TABLE 4B

| | | Focal length | |
| --- | --- | --- | --- |
| | | Main scanning direction | Sub scanning direction |
| Collimator lens 103 | fcol(mm) | 60.23 | 60.23 |
| Cylindrical lens 105 | fcyl(mm) | 93.81 | 93.81 |
| Anamorphic lens 108 | fapc(mm) | 35.70 | 23.66 |
| Arrangement | | | |
| Light source 101~sub scanning stop 102 | d0(mm) | 15.91 | |
| Sub scanning stop 102~incidence surface of collimator lens 103 | d1(mm) | 42.53 | |
| Incidence surface of collimator lens 103~exiting surface of collimator lens 103 | d2(mm) | 3.59 | |
| Exiting surface of collimator lens 103~incidence surface of cylindrical lens 105 | d3(mm) | 10.54 | |
| Incidence surface of cylindrical lens 105~exiting surface of cylindrical lens 105 | d4(mm) | 6.00 | |
| Exiting surface of cylindrical lens 105~main scanning stop 106 | d5(mm) | 63.81 | |
| Main scanning stop 106~incidence surface of wedge prism 107 | d6(mm) | 0.00 | |
| Incidence surface of wedge prism 107~exiting surface of wedge prism 107 | d7(mm) | 2.08 | |
| Exiting surface of wedge prism 107~deflecting surface of light deflector 110 | d8(mm) | 25.46 | |
| Incidence surface of wedge prism 107~incidence surface of anamorphic lens 108 | d9(mm) | 20.00 | |
| Incidence surface of anamorphic lens 108~exiting surface of anamorphic lens 108 | d10(mm) | 3.50 | |
| Exiting surface of anamorphic lens 108~light amount detection unit 109 | d11(mm) | 35.70 | |
| Incident angle on wedge prism 107 | A1(deg) | 29.28 | |
| Incident angle on deflecting surface of light deflector 110 | A2(deg) | 70.00 | |

TABLE 5A

| fθ coefficient, scanning width, angle of view | | |
| --- | --- | --- |
| fθ coefficient | k(mm/rad) | 200.18 |
| Scanning width | W(mm) | 335 |
| Maximum angle of view | θ(deg) | 48 |
| Refractive index | | |
| Anamorphic lens 111 refractive index | N5 | 1.5273 |
| Anamorphic lens 112 refractive index | N6 | 1.5273 |
| Scanning optical system, arrangement | | |
| Deflecting surface of light deflector 110~incidence surface of anamorphic lens 111 | d12(mm) | 26.50 |
| incidence surface of anamorphic lens 111~exiting surface of anamorphic lens 111 | d13(mm) | 9.60 |
| Exiting surface of anamorphic lens 111~incidence surface of anamorphic lens 112 | d14(mm) | 67.90 |
| Incidence surface of anamorphic lens 112~exiting surface of anamorphic lens 112 | d15(mm) | 5.50 |
| Exiting surface of anamorphic lens 112~surface 115 to be scanned | d16(mm) | 126.67 |
| Deflecting surface of light deflector 110~surface 115 to be scanned | d total2(mm) | 236.17 |

TABLE 5B

| | Anamorphic lens 111, meridional line shape | | | Anamorphic lens 111, sagittal line shape | |
| --- | --- | --- | --- | --- | --- |
| | Incidence surface 111a Light source side | Exiting surface 111b Light source side | | Incidence surface 111a Light source side | Exiting surface 111b Light source side |
| R | −7.12389E+01 | −4.14980E+01 | r | −1.00000E+03 | −1.00000E+03 |
| ku | 2.17680E+00 | 6.42947E−02 | D2u | 0 | 0 |
| B4u | 3.69128E−06 | 2.77878E−06 | D4u | 0 | 0 |
| B6u | 8.27275E−11 | 1.17980E−09 | D6u | 0 | 0 |
| B8u | 1.95630E−13 | 2.10270E−13 | D8u | 0 | 0 |
| B10u | 3.54758E−17 | 2.07452E−16 | D10u | 0 | 0 |
| | Side opposite to light source | Side opposite to light source | | Side opposite to light source | Side opposite to light source |
| kl | 2.17680E+00 | 6.42947E−02 | D2l | 0 | 0 |
| B4l | 3.69128E−06 | 2.77878E−06 | D4l | 0 | 0 |
| B6l | 8.27275E−11 | 1.17980E−09 | D6l | 0 | 0 |
| B8l | 1.95630E−13 | 2.17551E−13 | D8l | 0 | 0 |
| B10l | 3.54758E−17 | 2.02442E−16 | D10l | 0 | 0 |

TABLE 5B-continued

| | Anamorphic lens 112, meridional line shape | | | Anamorphic lens 112, sagittal line shape | |
|---|---|---|---|---|---|
| | Incidence surface 112a Light source side | Exiting surface 112b Light source side | | Incidence surface 112a Light source side | Exiting surface 112b Light source side |
| R | −8.24438E + 02 | 7.68000E+02 | r | −1.00000E+02 | −2.36478E+01 |
| ku | 0 | −5.89704E+02 | D2u | 0 | 7.00884E−05 |
| B4u | 0 | −2.57008E−07 | D4u | 0 | −1.56168E−08 |
| B6u | 0 | 2.17131E−11 | D6u | 0 | 2.15646E−12 |
| B8u | 0 | −1.47843E−11 | D8u | 0 | −1.68590E−16 |
| B10u | 0 | 4.78126E−20 | D10u | 0 | 5.61186E−21 |
| | Side opposite to light source | Side opposite to light source | | Side opposite to light source | Side opposite to light source |
| kl | 0 | −5.89704E+02 | D2l | 2.45000E−06 | 1.25282E−04 |
| B4l | 0 | −2.57008E−07 | D4l | −1.68000E−10 | −1.52826E−08 |
| B6l | 0 | 2.17131E−11 | D6l | 0 | 2.83271E+12 |
| B8l | 0 | −1.47843E−11 | D8l | 0 | −3.04294E−16 |
| B10l | 0 | 4.78126E−20 | D10l | 0 | 1.06411E−20 |

Note that, in Tables 4 and 5, when an intersection point of each lens surface and the optical axis is regarded as an origin point, a direction of the optical axis, an axis orthogonal to the optical axis within the main scanning section, and an axis orthogonal to the optical axis within the sub scanning section are an X axis, a Y axis, and a Z axis, respectively. Further, in Table 4 and Table 5, "E-x" means "x10$^{-x}$".

In this case, when calculation is performed using a focal length of the optical element 2 of 60.23 mm and a distance from the light source 101 to the main scanning stop 106 of 142.4 mm in this embodiment, the left side of Expression (1) is 0.28, which is larger than 0.2, and thus, Expression (1) is satisfied.

Next, in this embodiment, $FFP_y$ is 7.93°. The main scanning stop 106 is provided so as to be tilted, and thus, $D_y$ should be regarded as a width of the light beams perpendicular to the optical axis, and is, in this meaning, 4.23 mm. Further, $f_{col}$ is 60.23 mm. Therefore, the left side of Expression (2) is 0.069 and the right side of Expression (2) is 0.035. Thus, Expression (2) is satisfied.

In this embodiment, with regard to the spot diameter on the axis, the spot diameter in an ideal case in which the intensity distribution is uniform is 47.24 μm. On the other hand, the spot diameter when the FFP is taken into consideration is 47.29 μm. In this case, the enlargement rate is 0.11%. As described above, by structuring the scanning optical system so that Expression (2) is satisfied, the enlargement rate with respect to the spot diameter of a light beam emitted from a center point of the light source 101 of an ideal system can be limited to 5% or less.

In this embodiment, $FFP_y$ is 7.93°, $D_y$ is 4.23 mm, $f_{col}$ is 60.23 mm, $L_x$ is 142.4 mm, and $y_{LD}$ is 0.775 mm, and thus, the minimum intensity $I_{min}$ is 74.4% and Expression (3) is satisfied.

In this case, when the image height is zero, a spot diameter of a light beam emitted from the center point 21 is 47.29 μm, and a spot diameter of a light beam emitted from the edge light emission point 22 is 47.75 μm. Therefore, the rate of increase of the spot diameter is 0.97%. Further, when the image height is zero, the width of the depth of the focus of a light beam emitted from the center point 21 is 6.74 mm in the case of a 60 μm slice, and the width of the depth of the focus of a light beam emitted from the edge light emission point 22 is 6.56 mm. Therefore, the reduction rate of the width of the depth of the focus is 2.65%.

As in this embodiment, when the light beam conversion unit 107 is used so that the width of the light beam on the incident side becomes larger than the width of the light beam on the exiting side, the intensity at the edge of the main scanning stop 106 becomes lower, and thus, by the structure of the present invention, more remarkable effects of the present invention can be obtained.

As described above, by structuring the scanning optical system so as to satisfy Expression (3) according to claim 1 of the appended claims, the reduction rate of the depth of the focus of a light beam emitted from the edge light emission point of the light source 101 with respect to the depth of the focus of a light beam emitted from the center point can be limited to 10% or less.

According to the present invention, among light beams emitted from the light source 101, the further the location of a light emission point from the center point is, the more asymmetrical the intensity distribution of a light beam emitted from the light emission point through the main scanning stop 106 is, and thus, a light amount after the light beam passes through the main scanning stop 106 varies in the respective light emission points.

Therefore, in order to equalize the light amount on the surface 115 to be scanned in the respective light emission points, it is necessary to adjust the light amount for the respective light emission points.

The light emission controller 116 determines, based on information on light emission timing obtained from information on the light amount obtained from the light amount detection unit 109, the amount of light emitted from the light source 101, and controls light to be emitted from the light source 101.

As described above, by the structure in this embodiment, a scanning optical system can be provided which secures a width of a depth of a focus, and still, realizes reduced costs, higher definition, and enhanced speed.

In the embodiment described above, the light source 101 is not limited to a VCSEL. Insofar as the structure satisfies the conditional expression (1), remarkable effects of the present invention can be obtained.

Further, the arrangement in the light source 101 is not limited to a one-dimensional one. Even if the arrangement is a two-dimensional one, insofar as the conditional expression (1) is satisfied, the effects of the present invention can be obtained.

[Image Forming Apparatus]

Figure 11:
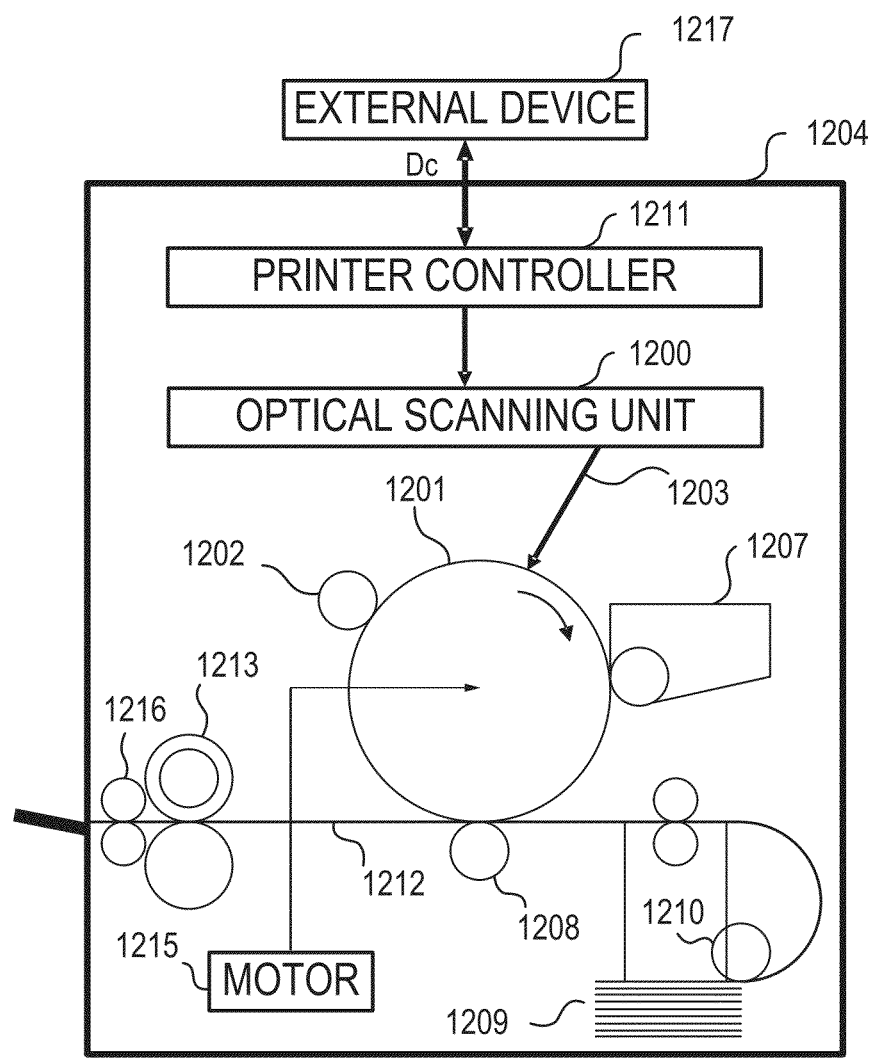
FIG. 11 is a schematic view of an image forming apparatus including the scanning optical system of the present invention.

FIG. 11 is a sectional view of a principal part taken in the sub scanning direction illustrating an image forming apparatus according to an embodiment of the present invention. With reference to FIG. 11, coded data Dc from an external device 1217 such as a personal computer is input to an image forming apparatus 1204. The coded data Dc is converted into image data (dot data) Di by a printer controller 1211 in the apparatus. The image data Di is input to an optical scanning unit (scanning optical system) 1200 which has a structure described in any one of the first to third embodiments. A light beam 1203 which is modulated in accordance with the image data Di is emitted from the optical scanning unit 1200, and the light beam 1203 scans a photosensitive surface of a photosensitive drum 1201 in the main scanning direction.

The photosensitive drum 1201 as an electrostatic latent image bearing member (photosensitive member) is rotated clockwise by a motor 1215. The rotation involves movement of the photosensitive surface of the photosensitive drum 1201 in the sub scanning direction orthogonal to the main scanning direction with respect to the light beam 1203. A charging roller 1202 for uniformly charging the surface of the photosensitive drum 1201 is provided above the photosensitive drum 1201 so as to be in abutment against the surface. The surface of the photosensitive drum 1201 charged by the charging roller 1202 is irradiated with the scanning light beam 1203 emitted from the optical scanning unit 1200.

As described above, the light beam 1203 is modulated based on the image data Di, and, by radiating the light beam 1203, an electrostatic latent image is formed on the surface of the photosensitive drum 1201 (on the photosensitive member). The electrostatic latent image is developed as a toner image by a developing unit 1207 which is on a downstream side in a rotational direction of the photosensitive drum 1201 with respect to a location at which the light beam 1203 is radiated and which is provided so as to be in abutment against the photosensitive drum 1201.

The toner image developed by the developing unit 1207 is transferred onto a sheet 1212 as a transferred material by a transfer roller (transferring unit) 1208 provided below the photosensitive drum 1201 so as to be opposed to the photosensitive drum 1201. The sheet 1212 is received in a sheet cassette 1209 on an upstream side with respect to the photosensitive drum 1201 (right side in FIG. 11), but manual feeding is also possible. A sheet feeding roller 1210 is provided at an edge of the sheet cassette 1209 so as to feed the sheet 1212 in the sheet cassette 1209 into a conveyance path.

The sheet 1212 onto which the unfixed toner image is transferred as described above is further conveyed to a fixing unit on a downstream side with respect to the photosensitive drum 1201 (left side in FIG. 11). The fixing unit includes a fixing roller 1213 having therein a fixing heater (not shown), and a pressure roller 1214 provided so as to be in press contact with the fixing roller 1213. By pressurizing and heating the sheet 1212 conveyed from a transfer portion by a press contact portion between the fixing roller 1213 and the pressure roller 1214, the unfixed toner image is fixed on the sheet 1212. A sheet delivery roller 1216 is further provided on a downstream side with respect to the fixing roller 1213 so as to deliver the sheet 1212 with the image fixed thereto to the outside of the image forming apparatus.

The printer controller 1211 not only converts data as described above but also controls respective portions in the image forming apparatus including the motor 1215, a polygonal motor in the optical scanning unit to be described below, and the like.

[Color Image Forming Apparatus]

Figure 12:
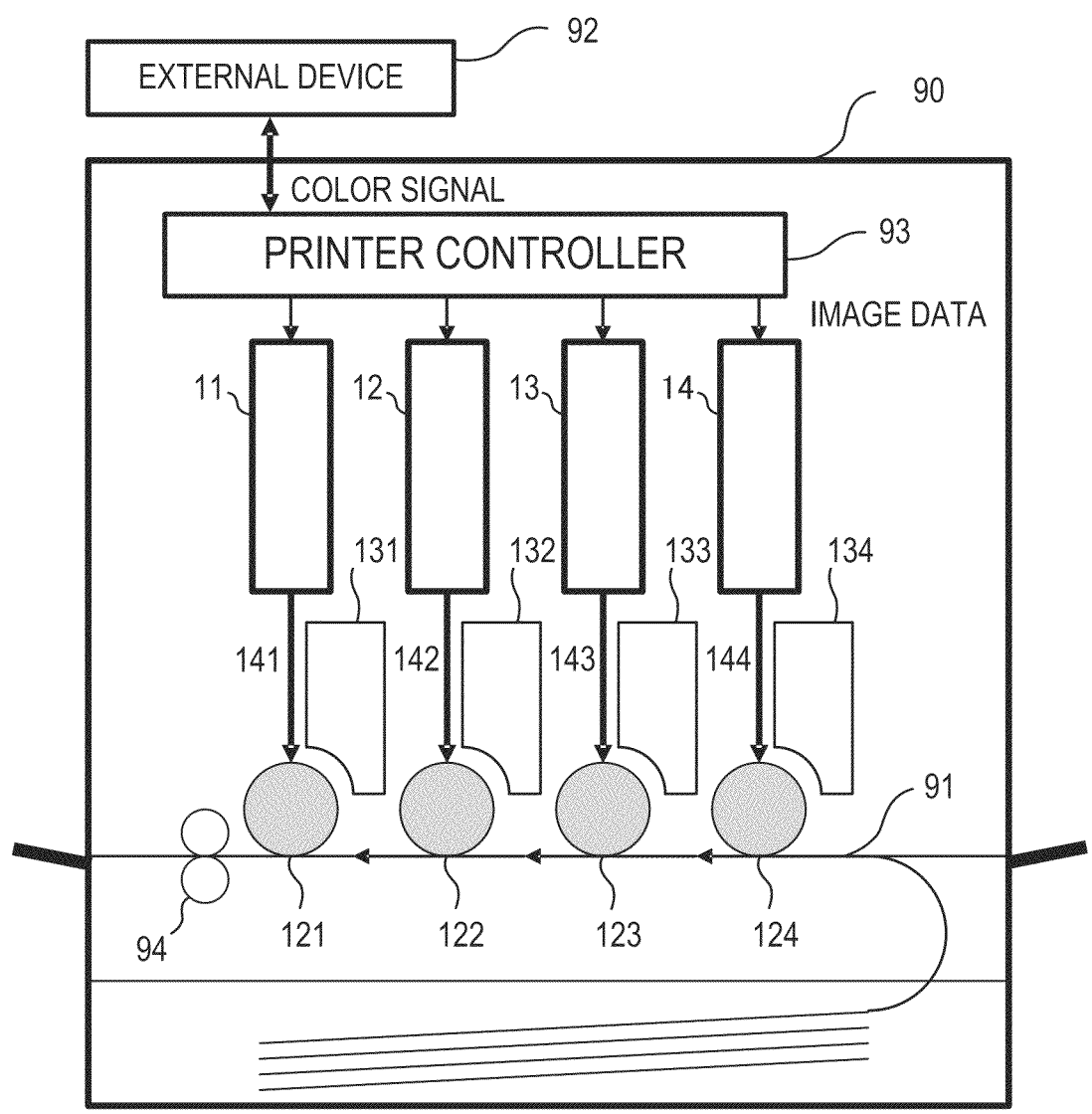
FIG. 12 is a schematic view of a color image forming apparatus including the scanning optical system of the present invention.

FIG. 12 is a schematic view of a principal part of a color image forming apparatus according to an embodiment of the present invention. This embodiment is a tandem type color image forming apparatus in which four scanning optical systems are arranged side by side for recording image information on surfaces of photosensitive drums as image bearing members, respectively, in tandem with one another. With reference to FIG. 12, a color image forming apparatus 90 includes scanning optical systems 11, 12, 13, and 14 each having a structure described in any one of the first to third embodiments, photosensitive drums 121, 122, 123, and 124 as image bearing members, developing units 131, 132, 133, and 134, a conveying belt 91 and a sheet delivery roller 94.

With reference to FIG. 12, color signals of R (red), G (green), and B (blue) are input to the color image forming apparatus 90 from an external device 92 such as a personal computer. These color signals are converted by a printer controller 93 in the apparatus into image data (dot data) of C (cyan), M (magenta), Y (yellow), and B (black). These image data are input to the scanning optical systems 11, 12, 13, and 14, respectively. Light beams 141, 142, 143, and 144 which are modulated in accordance with the image data are emitted from these scanning optical systems, respectively, and these light beams scan photosensitive surfaces of the photosensitive drums 121, 122, 123, and 124, respectively, in the main scanning direction.

In the color image forming apparatus according to this embodiment, the four scanning optical systems 11, 12, 13, and 14 are arranged side by side, correspond to the colors of C (cyan), M (magenta), Y (yellow), and B (black), and record image signals (image information) on the surfaces of the photosensitive drums 121, 122, 123, and 124, respectively, in tandem with one another, to thereby print a color image at high speed.

As described above, in the color image forming apparatus according to this embodiment, by using light beams which are emitted from the four scanning optical systems 11, 12, 13, and 14 based on the respective image data, latent images of the respective colors are formed on the surfaces of the corresponding photosensitive drums 121, 122, 123, and 124, respectively. After that, the images are transferred onto a recording material so as to be overlaid on one another to form one full color image.

As the external device 92 described above, for example, a color image reading apparatus including a CCD sensor may be used. In this case, the color image reading apparatus and the color image forming apparatus 90 form a color digital copying machine.

Exemplary embodiments of the present invention have been described above, but the present invention is not limited thereto and various variations and modifications are possible within the gist of the present invention. Further, a recording density of the image forming apparatus used in the present invention is not specifically limited. However, taking into consideration that, as the recording density becomes higher, required image quality becomes higher, the structures described in the first to third embodiments of the present invention obtain more remarkable effects in an image forming apparatus of 1,200 dpi or more.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-268340, filed on Dec. 26, 2013, which is hereby incorporated by reference herein in its entirety.

What is claimed is:

1. A scanning optical system, comprising:
a light source comprising a plurality of light emission points;
a light deflector for deflecting a light beam in a main scanning direction;
an optical element for guiding the light beam emitted from the light source to the light deflector; and
a stop for blocking a part of the light beam emitted from the optical element,
the following expression being satisfied:

$$\left|\frac{(L_x - 2f_{col})y_{LD}}{f_{col}}\right| \geq 0.2$$

where $L_x$ is a distance (mm) from the light source to the stop, $f_{col}$ is a focal length (mm) of the optical element, and $y_{LD}$ is a distance (mm) in the main scanning direction between an optical axis of the optical element and a light emission point among the plurality of light emission points, which is farthest from the optical axis of the optical element in the main scanning direction,
the following expression being satisfied:

$$\tan\left(\frac{FFP_y}{2}\right) \geq \frac{D_y}{2f_{col}}$$

where $D_y$ is a diameter (mm) of an aperture of the stop in the main scanning direction, and $FFP_y$ is a total angle at half maximum (degree) of a far-field pattern of light emitted from the light source,
the light emission point which is farthest from the optical axis of the optical element in the main scanning direction satisfying:

$$\exp\left(-4(\ln 2)\left(\frac{\phi_y}{FFP_y}\right)^2\right) \geq 0.27$$

when an angle (degree) $\phi_y$ between a marginal ray within a main scanning section of the light beam emitted from the light source and a ray of light of a maximum intensity is defined as follows $$\phi_y = \tan^{-1}\left(\frac{0.5D_y + \frac{(L_x - 2f_{col})y_{LD}}{f_{col}}}{f_{col}}\right).$$

2. A scanning optical system according to claim 1, wherein, in order to equalize a light amount after the light beam passes through the stop among the plurality of light emission points of the light source, the light amount is adjusted for the respective plurality of light emission points with different adjustment amounts.

3. A scanning optical system according to claim 1, further comprising a light separating unit provided between the stop and the light deflector, for separating the light beam into transmitted light and reflected light.

4. A scanning optical system according to claim 1, wherein the plurality of light emission points are arranged one-dimensionally.

5. A scanning optical system according to claim 1, wherein the light source comprises a surface emission type light source.

6. A scanning optical system according to claim 1, wherein the total angle at half maximum of the far-field pattern of the light beam emitted from the light source is 10 degrees or smaller.

7. An image forming apparatus, comprising:
a scanning optical system comprising:
a light source comprising a plurality of light emission points;
a light deflector for deflecting a light beam in a main scanning direction;
an optical element for guiding the light beam emitted from the light source to the light deflector; and
a stop for blocking a part of the light beam emitted from the optical element,
the following expression being satisfied:

$$\left|\frac{(L_x - 2f_{col})y_{LD}}{f_{col}}\right| \geq 0.2$$

where $L_x$ is a distance (mm) from the light source to the stop, $f_{col}$ is a focal length (mm) of the optical element, and $y_{LD}$ is a distance (mm) in the main scanning direction between an optical axis of the optical element and a light emission point among the plurality of light emission points, which is farthest from the optical axis of the optical element in the main scanning direction, the following expression being satisfied:

$$\tan\left(\frac{FFP_y}{2}\right) \geq \frac{D_y}{2f_{col}}$$

where $D_y$ is a diameter (mm) of the stop in the main scanning direction, and $FFP_y$ is a total angle at half maximum (degree) of a far-field pattern of light emitted from the light source, the light emission point which is farthest from the optical axis of the optical element in the main scanning direction satisfying:

$$\exp\left(-4(\ln 2)\left(\frac{\phi_y}{FFP_y}\right)^2\right) \geq 0.27$$

when an angle (degree) $\phi_y$ between a marginal ray within a main scanning section of the light beam emitted from the light source and a ray of light of a maximum intensity is defined as follows, $$\phi_y = \tan^{-1}\left(\frac{0.5 D_y + \frac{(L_x - 2f_{col})y_{LD}}{f_{col}}}{f_{col}}\right);$$

a developing unit for developing, as a toner image, an electrostatic latent image formed on a photosensitive member by the scanning optical system;

a transferring unit for transferring the developed toner image onto a transferred material; and a fixing unit for fixing the transferred toner image onto the transferred material.

8. An image forming apparatus, comprising:

a scanning optical system comprising:

a light source comprising a plurality of light emission points;

a light deflector for deflecting a light beam in a main scanning direction;

an optical element for guiding the light beam emitted from the light source to the light deflector; and a stop for blocking a part of the light beam emitted from the optical element and guided by the light deflector, the following expression being satisfied:

$$\left|\frac{(L_x - 2f_{col})y_{LD}}{f_{col}}\right| \geq 0.2$$

where $L_x$ is a distance (mm) from the light source to the stop, $f_{col}$ is a focal length (mm) of the optical element, and $y_{LD}$ is a distance (mm) in the main scanning direction between an optical axis of the optical element and a light emission point among the plurality of light emission points, which is farthest from the optical axis of the optical element in the main scanning direction, the following expression being satisfied:

$$\tan\left(\frac{FFP_y}{2}\right) \geq \frac{D_y}{2f_{col}}$$

where $D_y$ is a diameter (mm) of an aperture of the stop in the main scanning direction, and $FFP_y$ is a total angle at half maximum (degree) of a far-field pattern of light emitted from the light source, the light emission point which is farthest from the optical axis of the optical element in the main scanning direction satisfying:

$$\exp\left(-4(\ln 2)\left(\frac{\phi_y}{FFP_y}\right)^2\right) \geq 0.27$$

when an angle (degree) $\phi_y$ between a marginal ray within a main scanning section of the light beam emitted from the light source and a ray of light of a maximum intensity is defined as follows, $$\phi_y = \tan^{-1}\left(\frac{0.5 D_y + \frac{(L_x - 2f_{col})y_{LD}}{f_{col}}}{f_{col}}\right);$$

and a printer controller for converting coded data which is input from an external device into an image signal and inputting the image signal to the scanning optical system.

\* \* \* \* \*